(12) United States Patent
Tanaka et al.

(10) Patent No.: US 10,289,355 B2
(45) Date of Patent: May 14, 2019

(54) IMAGE FORMING APPARATUS AND CONTROL METHOD FOR ADJUSTING PRINT POSITION

(71) Applicant: CANON KABUSHIKI KAISHA, Tokyo (JP)

(72) Inventors: Hirotomo Tanaka, Kashiwa (JP); Munetaka Sakata, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/836,084

(22) Filed: Dec. 8, 2017

(65) Prior Publication Data

US 2018/0165044 A1    Jun. 14, 2018

(30) Foreign Application Priority Data

Dec. 12, 2016  (JP) ................................ 2016-240253
Dec. 22, 2016  (JP) ................................ 2016-248689

(51) Int. Cl.
*G06F 3/12* (2006.01)
*G03G 15/00* (2006.01)
*G03G 15/043* (2006.01)

(52) U.S. Cl.
CPC ......... *G06F 3/1208* (2013.01); *G03G 15/043* (2013.01); *G03G 15/5062* (2013.01); *G06F 3/1244* (2013.01); *G03G 2215/00569* (2013.01); *G03G 2215/00776* (2013.01)

(58) Field of Classification Search
CPC ............. G03G 15/5062; G03G 15/043; G03G 2215/00561; G03G 2215/00569; G03G 2215/00776; G06F 3/12; G06F 3/1208
See application file for complete search history.

(56) References Cited

U.S. PATENT DOCUMENTS

| | | |
|---|---|---|
| 2005/0286922 A1 | 12/2005 | Oki |
| 2007/0002404 A1 | 1/2007 | Mongeon |
| 2007/0279447 A1* | 12/2007 | Kawasaki ............... B41J 29/393 347/19 |
| 2011/0304886 A1* | 12/2011 | Hoover ...................... B41J 3/60 358/1.18 |
| 2017/0104887 A1* | 4/2017 | Nomura ............. H04N 1/00355 |

FOREIGN PATENT DOCUMENTS

JP    2005-221582 A    8/2005

* cited by examiner

*Primary Examiner* — Carla J Therrien
(74) *Attorney, Agent, or Firm* — Canon U.S.A., Inc. IP Division

(57) ABSTRACT

An image forming apparatus includes a container in which a sheet is contained, an image forming unit configured to form an image on the sheet, a reading unit configured to read a test image formed on the sheet, and a controller. The image forming apparatus forms the test image on the sheet, reads the test image by the reading unit, and generates, based on a reading result of the reading unit, an image forming condition for correcting a shift between a position of an image to be formed on a first surface of the sheet and a position of an image to be formed on a second surface different from the first surface of the sheet, and determines a timing for the image forming unit to subsequently form the test image based on a time period during which the sheet is contained in the container.

18 Claims, 20 Drawing Sheets

FIG.4

SHEET LIBRARY EDITING — 400

| SHEET NAME — 411 | SUB-SCANNING DIRECTION SHEET LENGTH (mm) — 412 | MAIN SCANNING DIRECTION SHEET LENGTH (mm) — 413 | GRAMMAGE (g/m²) — 414 | SURFACE PROPERTY — 415 | COLOR — 416 | PRINT POSITION ADJUSTMENT — 417 |
|---|---|---|---|---|---|---|
| ABC COMPANY RECYCLE 1 | 210 | 297 | 75 | PLAIN PAPER | WHITE | — |
| ABC COMPANY RECYCLE 2 | 297 | 420 | 75 | PLAIN PAPER | WHITE | ALLOWED |
| DEF COMPANY EMBOSSED PAPER A-1 | 216 | 279 | 150 | EMBOSS | WHITE | — |
| DEF COMPANY COATED PAPER P-1 | 279 | 452 | 125 | DOUBLE-SIDED COATING | WHITE | — |
| XYZ COMPANY COLOR 81 | 210 | 297 | 75 | PLAIN PAPER | ORANGE | ALLOWED |
| XYZ COMPANY COLOR 82 | 210 | 297 | 75 | PLAIN PAPER | PINK | — |

ADD — 420  EDIT — 421  DELETE — 422  REGISTER — 423

SHEET ATTRIBUTE EDITING — 500

| | | |
|---|---|---|
| SHEET NAME | XYZ PAPER COLOR 81 | ~501 |
| SUB-SCANNING DIRECTION SHEET LENGTH (mm) | 210 | ~502 |
| MAIN SCANNING DIRECTION SHEET LENGTH (mm) | 297 | ~503 |
| GRAMMAGE (g/m$^2$) | 75 | ~504 |
| SURFACE PROPERTY | PLAIN PAPER ▼ | ~505 |
| COLOR | WHITE ▼ | ~506 |
| PRE-PRINTED SHEET | ☑ | ~507 |
| PRINT POSITION ADJUSTMENT WARNING | ☑ ~508   15 | ~509 |

END EDITING ~520     CANCEL ~521

FIG.6

| | FIG.6A |
|---|---|
| | FIG.6B |

FIG.6A

| | SHEET NAME 611 | SUB-SCANNING DIRECTION SHEET LENGTH (mm) 612 | MAIN SCANNING DIRECTION SHEET LENGTH (mm) 613 | GRAMMAGE (g/m²) 614 | SURFACE PROPERTY 615 | COLOR 616 | PRE-PRINTED SHEET 617 | PRINT POSITION SHIFT AMOUNT (FRONT SURFACE) 618 | PRINT POSITION SHIFT AMOUNT (BACK SURFACE) 619 | PRINT POSITION ADJUSTMENT INTERVAL 620 | INCREASING RATE 621 |
|---|---|---|---|---|---|---|---|---|---|---|---|
| 601 | ABC COMPANY RECYCLE1 | 210 | 297 | 75 | PLAIN PAPER | WHITE | NO | RIGHT-ANGLE CORRECTION AMOUNT: 0.23 mm TRAPEZOIDAL CORRECTION AMOUNT: 0.71 mm READ POSITION: 0.30 mm SIDE POSITION: -0.1 mm MAIN-SCANNING MAGNIFICATION: +0.02% SUB-SCANNING MAGNIFICATION: +0.01% | RIGHT-ANGLE CORRECTION AMOUNT: 0.27 mm TRAPEZOIDAL CORRECTION AMOUNT: 0.55 mm READ POSITION: 0.20 mm SIDE POSITION: 0.10 mm MAIN-SCANNING MAGNIFICATION: +0.02% SUB-SCANNING MAGNIFICATION: -0.03% | 10 | 1.5 |
| 602 | ABC COMPANY RECYCLE2 | 297 | 420 | 75 | PLAIN PAPER | WHITE | NO | RIGHT-ANGLE CORRECTION AMOUNT: 0.00 mm TRAPEZOIDAL CORRECTION AMOUNT: 0.00 mm READ POSITION: 0.00 mm SIDE POSITION: 0.00 mm MAIN-SCANNING MAGNIFICATION: +0.00% SUB-SCANNING MAGNIFICATION: +0.00% | RIGHT-ANGLE CORRECTION AMOUNT: 0.00 mm TRAPEZOIDAL CORRECTION AMOUNT: 0.00 mm READ POSITION: 0.00 mm SIDE POSITION: 0.00 mm MAIN-SCANNING MAGNIFICATION: +0.00% SUB-SCANNING MAGNIFICATION: +0.00% | 10 | 1.5 |

FIG.6B

| | SHEET NAME 611 | SUB-SCANNING DIRECTION SHEET LENGTH (mm) 612 | MAIN SCANNING DIRECTION SHEET LENGTH (mm) 613 | GRAMMAGE (g/m²) 614 | SURFACE PROPERTY 615 | COLOR 616 | PRE-PRINTED SHEET 617 | PRINT POSITION SHIFT AMOUNT (FRONT SURFACE) 618 | PRINT POSITION SHIFT AMOUNT (BACK SURFACE) 619 | PRINT POSITION ADJUSTMENT INTERVAL 620 | INCREASING RATE 621 |
|---|---|---|---|---|---|---|---|---|---|---|---|
| 603 | DEF COMPANY EMBOSSED PAPER A-1 | 216 | 279 | 170 | EMBOSS | WHITE | NO | RIGHT-ANGLE CORRECTION AMOUNT: -0.48 mm TRAPEZOIDAL CORRECTION AMOUNT: 0.41 mm READ POSITION: 0.50 mm SIDE POSITION: -0.50 mm MAIN-SCANNING MAGNIFICATION: +0.02% SUB-SCANNING MAGNIFICATION: +0.02% | RIGHT-ANGLE CORRECTION AMOUNT: 0.08 mm TRAPEZOIDAL CORRECTION AMOUNT: 0.29 mm READ POSITION: -0.30 mm SIDE POSITION: 0.50 mm MAIN-SCANNING MAGNIFICATION: -0.01% SUB-SCANNING MAGNIFICATION: -0.03% | 20 | 2.0 |
| 604 | DEF COMPANY COATED PAPER P-1 | 279 | 432 | 128 | DOUBLE-SIDED COATING | WHITE | NO | RIGHT-ANGLE CORRECTION AMOUNT: 0.11 mm TRAPEZOIDAL CORRECTION AMOUNT: -0.21 mm READ POSITION: 0.40 mm SIDE POSITION: -0.20 mm MAIN-SCANNING MAGNIFICATION: +0.12% SUB-SCANNING MAGNIFICATION: +0.08% | RIGHT-ANGLE CORRECTION AMOUNT: 0.41 mm TRAPEZOIDAL CORRECTION AMOUNT: -0.31 mm READ POSITION: -0.20 mm SIDE POSITION: 0.60 mm MAIN-SCANNING MAGNIFICATION: -0.02% SUB-SCANNING MAGNIFICATION: -0.01% | 18 | 1.7 |
| 605 | XYZ COMPANY COLOR 81 | 210 | 297 | 75 | PLAIN PAPER | ORANGE | NO | RIGHT-ANGLE CORRECTION AMOUNT: 0.00 mm TRAPEZOIDAL CORRECTION AMOUNT: 0.00 mm READ POSITION: 0.00 mm SIDE POSITION: 0.00 mm MAIN-SCANNING MAGNIFICATION: +0.00% SUB-SCANNING MAGNIFICATION: +0.00% | RIGHT-ANGLE CORRECTION AMOUNT: 0.00 mm TRAPEZOIDAL CORRECTION AMOUNT: 0.00 mm READ POSITION: 0.00 mm SIDE POSITION: 0.00 mm MAIN-SCANNING MAGNIFICATION: +0.00% SUB-SCANNING MAGNIFICATION: +0.00% | 15 | 2.0 |

FIG.8

| | | MEASURED VALUE (820) | IDEAL VALUE (821) | PRINT POSITION SHIFT AMOUNT (822) |
|---|---|---|---|---|
| 801 | READ POSITION (FRONT SURFACE) | (C + E) / 2 | 1 cm | MEASURED VALUE − IDEAL VALUE |
| 802 | SIDE POSITION (FRONT SURFACE) | (F + J) / 2 | 1 cm | MEASURED VALUE − IDEAL VALUE |
| 803 | MAIN-SCANNING MAGNIFICATION (FRONT SURFACE) | ((B − D − F) + (B − H − J)) / 2 | MAIN SCANNING DIRECTION SHEET LENGTH − 2 cm | (MEASURED VALUE − IDEAL VALUE) / IDEAL VALUE |
| 804 | SUB-SCANNING MAGNIFICATION (FRONT SURFACE) | ((A − C − G) + (A − E − I)) / 2 | SUB-SCANNING DIRECTION SHEET LENGTH − 2 cm | (MEASURED VALUE − IDEAL VALUE) / IDEAL VALUE |
| 805 | RIGHT-ANGLE CORRECTION AMOUNT (FRONT SURFACE) | (S + T) / 2 | 0 cm | MEASURED VALUE |
| 806 | TRAPEZOIDAL CORRECTION AMOUNT (FRONT SURFACE) | ((B − D − F) + (B − H − J)) | 0 cm | MEASURED VALUE |
| 807 | READ POSITION (BACK SURFACE) | (K + M) / 2 | 1 cm | MEASURED VALUE − IDEAL VALUE |
| 808 | SIDE POSITION (BACK SURFACE) | (N + R) / 2 | 1 cm | MEASURED VALUE − IDEAL VALUE |
| 809 | MAIN-SCANNING MAGNIFICATION (BACK SURFACE) | ((B − L − N) + (B − P − R)) / 2 | MAIN SCANNING DIRECTION SHEET LENGTH − 2 cm | (MEASURED VALUE − IDEAL VALUE) / IDEAL VALUE |
| 810 | SUB-SCANNING MAGNIFICATION (BACK SURFACE) | ((A − K − O) + (A − M − Q)) / 2 | SUB-SCANNING DIRECTION SHEET LENGTH − 2 cm | (MEASURED VALUE − IDEAL VALUE) / IDEAL VALUE |
| 811 | RIGHT-ANGLE CORRECTION AMOUNT (BACK SURFACE) | (U + V) / 2 | 0 cm | MEASURED VALUE |
| 812 | TRAPEZOIDAL CORRECTION AMOUNT (BACK SURFACE) | ((B − L − N) + (B − P − R)) | 0 cm | MEASURED VALUE |

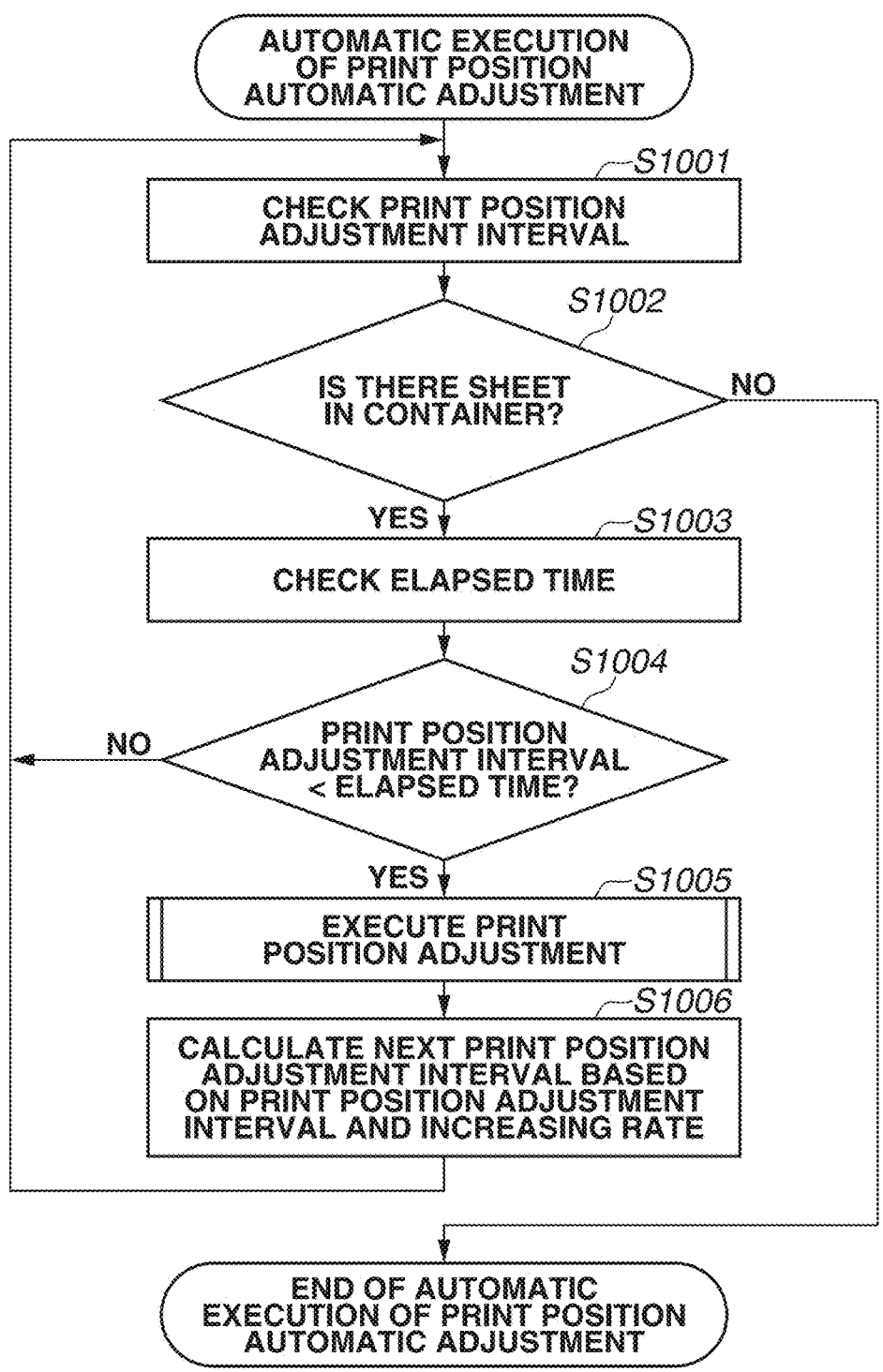

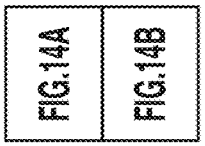

FIG. 14A

| SHEET NAME | SUB-SCANNING DIRECTION SHEET LENGTH (mm) | MAIN SCANNING DIRECTION SHEET LENGTH (mm) | GRAMMAGE (g/m²) | SURFACE PROPERTY | COLOR | PRE-PRINTED SHEET | PRINT POSITION SHIFT AMOUNT (FRONT SURFACE) | PRINT POSITION SHIFT AMOUNT (BACK SURFACE) | PRINT POSITION ADJUSTMENT INTERVAL | INCREASING RATE | PRINT POSITION ADJUSTMENT WARNING |
|---|---|---|---|---|---|---|---|---|---|---|---|
| | 611 | 612 | 613 | 614 | 615 | 616 | 617 | 618 | 619 | 620 | 621 | 622 |
| 601 ABC COMPANY RECYCLE 1 | 210 | 297 | 75 | PLAIN PAPER | WHITE | NO | RIGHT-ANGLE CORRECTION AMOUNT: 0.23 mm TRAPEZOIDAL CORRECTION AMOUNT: 0.71 mm READ POSITION: 0.30 mm SIDE POSITION: -0.10 mm MAIN-SCANNING MAGNIFICATION: +0.02% SUB-SCANNING MAGNIFICATION: +0.01% | RIGHT-ANGLE CORRECTION AMOUNT: 0.27 mm TRAPEZOIDAL CORRECTION AMOUNT: 0.55 mm READ POSITION: 0.20 mm SIDE POSITION: 0.10 mm MAIN-SCANNING MAGNIFICATION: +0.02% SUB-SCANNING MAGNIFICATION: -0.03% | 10 | 1.5 | — |
| 602 ABC COMPANY RECYCLE 2 | 297 | 420 | 75 | PLAIN PAPER | WHITE | NO | RIGHT-ANGLE CORRECTION AMOUNT: 0.00 mm TRAPEZOIDAL CORRECTION AMOUNT: 0.00 mm READ POSITION: 0.00 mm SIDE POSITION: 0.00 mm MAIN-SCANNING MAGNIFICATION: +0.00% SUB-SCANNING MAGNIFICATION: +0.00% | RIGHT-ANGLE CORRECTION AMOUNT: 0.00 mm TRAPEZOIDAL CORRECTION AMOUNT: 0.00 mm READ POSITION: 0.00 mm SIDE POSITION: 0.00 mm MAIN-SCANNING MAGNIFICATION: +0.00% SUB-SCANNING MAGNIFICATION: +0.00% | 10 | 1.5 | ALLOWED |

FIG.14B

| | SHEET NAME 611 | SUB-SCANNING DIRECTION SHEET LENGTH (mm) 612 | MAIN SCANNING DIRECTION SHEET LENGTH (mm) 613 | GRAMMAGE (g/m²) 614 | SURFACE PROPERTY 615 | COLOR 616 | PRE-PRINTED SHEET 617 | PRINT POSITION SHIFT AMOUNT (FRONT SURFACE) 618 | PRINT POSITION SHIFT AMOUNT (BACK SURFACE) 619 | PRINT POSITION ADJUSTMENT INTERVAL 620 | INCREASING RATE 621 | PRINT POSITION ADJUSTMENT WARNING 622 |
|---|---|---|---|---|---|---|---|---|---|---|---|---|
| 603 | DEF COMPANY EMBOSSED PAPER A-1 | 216 | 279 | 170 | EMBOSS | WHITE | NO | RIGHT-ANGLE CORRECTION AMOUNT: -0.49 mm TRAPEZOIDAL CORRECTION AMOUNT: 0.41 mm READ POSITION: 0.50 mm SIDE POSITION: -0.50 mm MAIN-SCANNING MAGNIFICATION: +0.02% SUB-SCANNING MAGNIFICATION: +0.02% | RIGHT-ANGLE CORRECTION AMOUNT: 0.08 mm TRAPEZOIDAL CORRECTION AMOUNT: 0.29 mm READ POSITION: -0.30 mm SIDE POSITION: 0.50 mm MAIN-SCANNING MAGNIFICATION: +0.01% SUB-SCANNING MAGNIFICATION: -0.03% | 20 | 2.0 | — |
| 604 | DEF COMPANY COATED PAPER P-1 | 279 | 432 | 128 | DOUBLE-SIDED COATING | WHITE | NO | RIGHT-ANGLE CORRECTION AMOUNT: 0.11 mm TRAPEZOIDAL CORRECTION AMOUNT: -0.21 mm READ POSITION: 0.40 mm SIDE POSITION: -0.20 mm MAIN-SCANNING MAGNIFICATION: -0.12% SUB-SCANNING MAGNIFICATION: +0.08% | RIGHT-ANGLE CORRECTION AMOUNT: 0.41 mm TRAPEZOIDAL CORRECTION AMOUNT: -0.31 mm READ POSITION: -0.20 mm SIDE POSITION: 0.60 mm MAIN-SCANNING MAGNIFICATION: -0.02% SUB-SCANNING MAGNIFICATION: -0.01% | 18 | 1.7 | — |
| 605 | XYZ COMPANY COLOR B1 | 210 | 297 | 75 | PLAIN PAPER | ORANGE | NO | RIGHT-ANGLE CORRECTION AMOUNT: 0.00 mm TRAPEZOIDAL CORRECTION AMOUNT: 0.00 mm READ POSITION: 0.00 mm SIDE POSITION: 0.00 mm MAIN-SCANNING MAGNIFICATION: +0.00% SUB-SCANNING MAGNIFICATION: +0.00% | RIGHT-ANGLE CORRECTION AMOUNT: 0.00 mm TRAPEZOIDAL CORRECTION AMOUNT: 0.00 mm READ POSITION: 0.00 mm SIDE POSITION: 0.00 mm MAIN-SCANNING MAGNIFICATION: +0.00% SUB-SCANNING MAGNIFICATION: +0.00% | 15 | 2.0 | ALLOWED |

IMAGE FORMING APPARATUS AND CONTROL METHOD FOR ADJUSTING PRINT POSITION

BACKGROUND OF THE INVENTION

Field of the Invention

One disclosed aspect of the embodiments relates to a print position adjustment control for adjusting an image forming position on a sheet.

Description of the Related Art

A typical image forming apparatus has a print position adjustment function for adjusting an image print position (also referred to as an image forming position) on a sheet so that an image is printed at an intended position on the sheet. The adjustment of the print position enables provision of, for example, a high-quality printed matter in which the print position of an image formed on the front surface and the print position of an image formed on the back surface are aligned with a high accuracy in double-side printing. In addition, for example, it is possible to provide a high-quality printed matter in which ruled lines and images are printed so as not to overlap each other when images are printed on a pre-printed sheet on which ruled lines or the like are printed in advance.

It is necessary to execute the print position adjustment for each type of sheets on which an image is printed. This is because the amount of expansion and contraction of each sheet varies depending on the size, grammage, material, and other characteristics of the sheet.

In order to detect a shift of a print position, the print position adjustment uses a test sheet that is created by printing a test image on a target sheet. An image forming apparatus detects a shift of a print position based on, for example, information about a length from a reference position of the test sheet to the test image, and determines an image forming condition for correcting the print position based on the detection result. Further, when the image forming apparatus performs print processing using a sheet of the same type as the target sheet, the print position is corrected based on the image forming condition.

Incidentally, it has been experimentally found that the quality of a sheet varies depending on the water content of the sheet. As a result of printing an image on sheets of the same type that are left in different humidity environments, the print position of the image on each of the sheets varied. Sheets used for printing are generally sold in a state where the sheets are wrapped in wrapping paper so as to maintain the quality of the sheets. The wrapping paper is subjected to, for example, special processing for preventing sheets from absorbing moisture. When sheets are stored in each container of the image forming apparatus, an operator unwraps a package of sheets and then stores the sheets in the container. Accordingly, there is a possibility that the water content of the sheets starts to change after the package is unwrapped.

In a case where unwrapped sheets are stored in a container of an image forming apparatus installed in a low-humidity room, the water content of the sheets decreases with time. Accordingly, the dimensions of the sheets stored in the container for a long period of time become smaller than the dimensions of the sheets immediately after the sheets are unwrapped. In some types of sheets, the dimensions of the sheets stored in the container for a long period of time may become larger than the dimensions of the sheets immediately after the sheets are unwrapped.

Accordingly, an image forming apparatus discussed in Japanese Patent Application Laid-Open No. 2005-221582 automatically executes a print position adjustment every time a predetermined operating time for the image forming apparatus has elapsed. Specifically, the image forming apparatus discussed in Japanese Patent Application Laid-Open No. 2005-221582 includes a timer. In the image forming apparatus, a test sheet is automatically printed every time a predetermined operating time for the image forming apparatus has elapsed, and the test sheet is conveyed to a reading sensor to adjust the print position based on the result of reading the test image on the test sheet.

However, it is very difficult for the image forming apparatus discussed in Japanese Patent Application Laid-Open No. 2005-221582 to execute the print position adjustment according to a change in the water content of each sheet.

The water content of the sheets immediately after the sheets are unwrapped has started to change immediately, but the water content of the sheets is stabilized with time after the sheets are unwrapped. The water content of the sheets converges to a water content that balances with the environmental humidity in which the image forming apparatus is installed, i.e., the humidity in the container of the image forming apparatus. It has also been experimentally found that the amount of shift of the print position due to an elapse of time changes little in a state where the water content of sheets balances with the environmental humidity. The state in which the water content of sheets balances with the environmental humidity is referred to as an equilibrium state.

Accordingly, in the image forming apparatus discussed in Japanese Patent Application Laid-Open No. 2005-221582, there is a possibility that the amount of shift of the print position on the sheet immediately after the sheets are unwrapped may exceed an allowable range, or the print position adjustment may be excessively executed. Further, since the point position adjustment is executed in the image forming apparatus, down time occurs, which leads to deterioration in the productivity when the print position adjustment is excessively executed. In this way, in the image forming apparatus discussed in Japanese Patent Application Laid-Open No. 2005-221582, the test sheet for print position adjustment cannot be printed at an appropriate timing in consideration of a change in the water content of each sheet.

SUMMARY OF THE INVENTION

According to an aspect of the embodiments, an image forming apparatus includes a container, an image forming unit, a reading unit, and a controller. In the container, a sheet is contained. The image forming unit is configured to form an image on the sheet. The reading unit is configured to read a test image formed on the sheet. The controller is configured to: (1) control the image forming unit to form the test image on the sheet, (2) control the reading unit to read the test image, and (3) generate, based on a reading result of the reading unit, an image forming condition for correcting a shift between a position of an image to be formed on a first surface of the sheet by the image forming unit and a position of an image to be formed on a second surface different from the first surface of the sheet by the image forming unit. The controller determines a timing for the image forming unit to subsequently form the test image based on a time period during which the sheet is contained in the container.

Further features of the disclosure will become apparent from the following description of exemplary embodiments with reference to the attached drawings.

BRIEF DESCRIPTION OF THE DRAWINGS

FIG. 4 is a schematic diagram illustrating an interface screen for operating a sheet library.

FIG. 5 is a schematic diagram illustrating an interface screen for inputting an attribute of a sheet.

FIG. 6 (consisting of FIGS. 6A and 6B) is a table illustrating the sheet library.

FIG. 8 is a table illustrating processing for deriving a print position shift amount.

FIG. 9 is a flowchart illustrating a print position adjustment operation.

FIG. 14 is a table illustrating a sheet library according to another exemplary embodiment.

DESCRIPTION OF THE EMBODIMENTS

<Configuration of Printing System>

Figure 1:
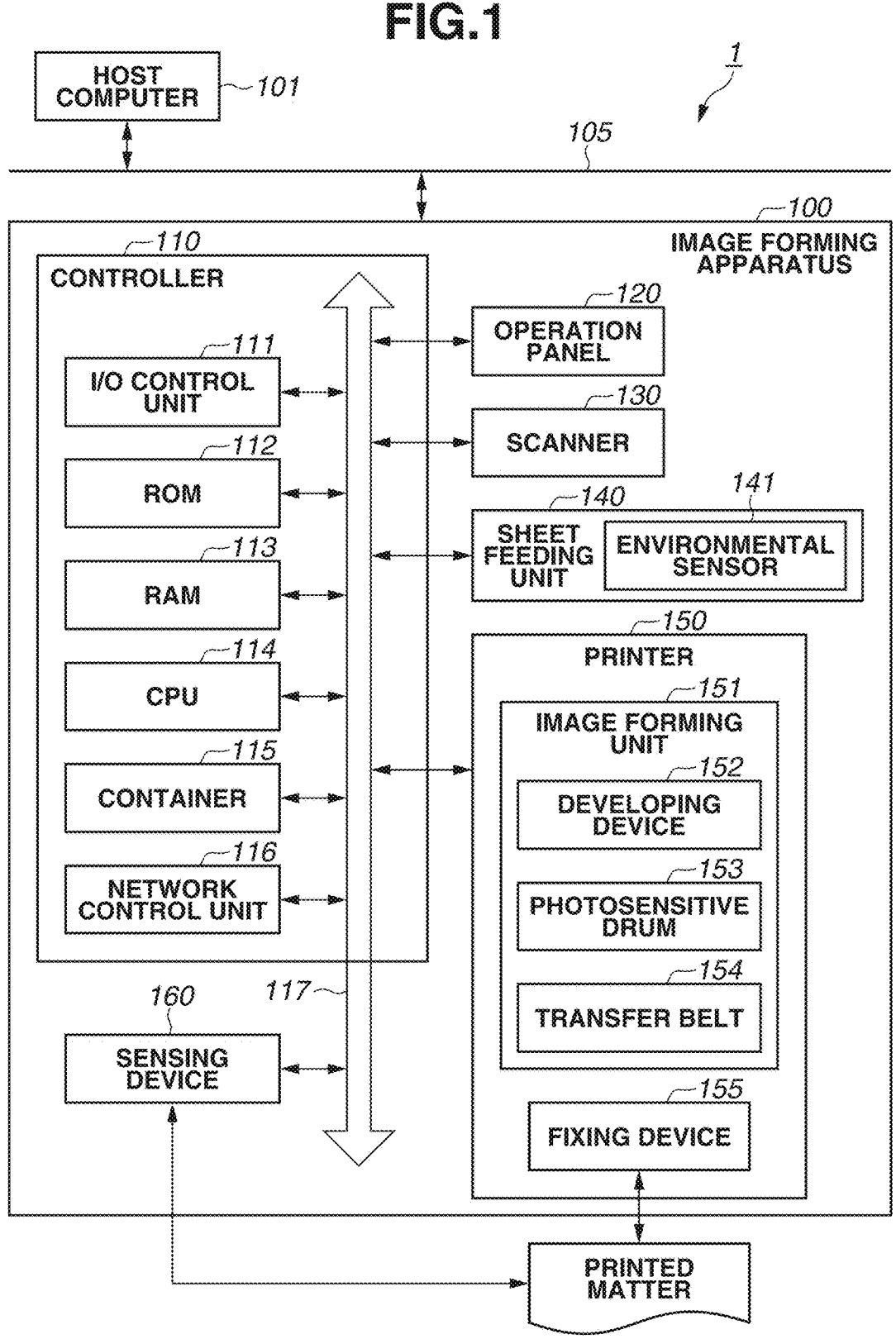
FIG. 1 is a block diagram illustrating an overall configuration of a printing system.

FIG. 1 is a block diagram illustrating an overall configuration of a printing system including an image forming apparatus according to the present exemplary embodiment. A printing system 1 includes an image forming apparatus 100 and a host computer 101. The image forming apparatus 100 and the host computer 101 are communicably connected via a network 105. The network 105 is a communication line such as a local area network (LAN) or a wide area network (WAN). A plurality of image forming apparatuses 100 and a plurality of host computers 101 may be connected to the network 105.

The host computer 101 is, for example, a server. The host computer 101 creates a print job according to an input operation by an operator, and transmits the created print job to the image forming apparatus 100 via the network 105. The print job includes various pieces of information necessary for printing, such as image data, the type of each sheet used for printing, the number of sheets to be printed, and an instruction on double-side printing or single-side printing.

The image forming apparatus 100 includes a controller 110, an operation panel 120, a scanner 130, a sheet feeding unit 140, a printer 150, and a sensing device 160. Note that the sensing device 160 may be connected to the image forming apparatus 100 as an accessory device separate from the image forming apparatus 100. The image forming apparatus 100 creates a printed matter by forming an image on a sheet based on the print job acquired from the host computer 101. The controller 110, the operation panel 120, the scanner 130, the sheet feeding unit 140, the printer 150, and the sensing device 160 are communicably connected to each other via a system bus 117.

The controller 110 controls each unit of the image forming apparatus 100. The operation panel 120 is a user interface. The operation panel 120 includes operation buttons, a key pad, a display device such as a liquid crystal display (LCD), and a touch panel. The operator can input a print job, a command, a print setting, and the like to the image forming apparatus 100 via the operation panel 120. The operation panel 120 displays a setting screen and a state on the display device. The scanner 130 generates image data by scanning an image on an original document. The controller 110 causes the image forming apparatus 100 to print the image based on the image data generated by the scanner 130.

The sheet feeding unit 140 includes a plurality of containers each configured to store sheets. The container includes a feed roller configured to feed the sheets stored in the containers. The feed roller feeds the sheets to the printer 150 one by one from an uppermost sheet of a sheet bundle stacked in each container. The sheet feeding unit 140 includes an environmental sensor 141 configured to detect environmental conditions such as an ambient temperature, humidity, and the like of each container.

The controller 110 controls the printer 150 to print an image corresponding to image data on a sheet fed from the sheet feeding unit 140. The printer 150 includes a fixing device 155 and an image forming unit 151 including a developing device 152, a photosensitive drum 153, and a transfer belt 154. The printer 150 generates a printed matter by forming an image corresponding to image data on a sheet, and outputs the printed matter. A specific configuration of the image forming unit 151 will be described below. The sensing device 160 reads the printed manner generated by the printer 150, and transfers the reading result to the controller 110. A specific configuration of the sensing device 160 will be described below.

The configuration of the controller 110 is described below. The controller 110 is a computer including a read only memory (ROM) 112, a random access memory (RAM) 113, and a central processing unit (CPU) 114. The controller 110 also includes an input/output (I/O) control unit 111, a storage 115, and a network control unit 116.

The I/O control unit 111 is an interface configured to control communication with the operation panel 120, the scanner 130, the sheet feeding unit 140, the printer 150, the sensing device 160, and the like. The controller 110 communicates with each unit constituting the image forming apparatus 100 via the I/O control unit 111. The storage 115 is a large capacity storage device such as a hard disk drive (HDD) or a solid state drive (SSD). The storage 115 stores control programs and various data such as image data used for image forming processing (print processing). The network control unit 116 is an interface configured to control communication with another device (host computer 101) via the network 105. The image forming apparatus 100 uses the network control unit 116 to communicate with another device via the network.

The CPU 114 loads a startup program from the ROM 112 into the RAM 113, and executes the startup program using the RAM 113 as a work area, thereby performing startup processing for the image forming apparatus 100. Further, the CPU 114 loads a control program from the storage 115 into the RAM 113 after the startup, and executes the control program using the RAM 113 as a work area, thereby controlling the image forming apparatus 100 to perform image forming processing (print processing). The CPU 114 stores, in the RAM 113 or the storage 115, setting information about an operation mode of the image forming apparatus 100, input from the operation panel 120. Note that the controller 110 may include a non-volatile rewritable memory, and may be configured to store, in the memory, setting information about the operation mode input from the operation panel 120.

Figure 2:
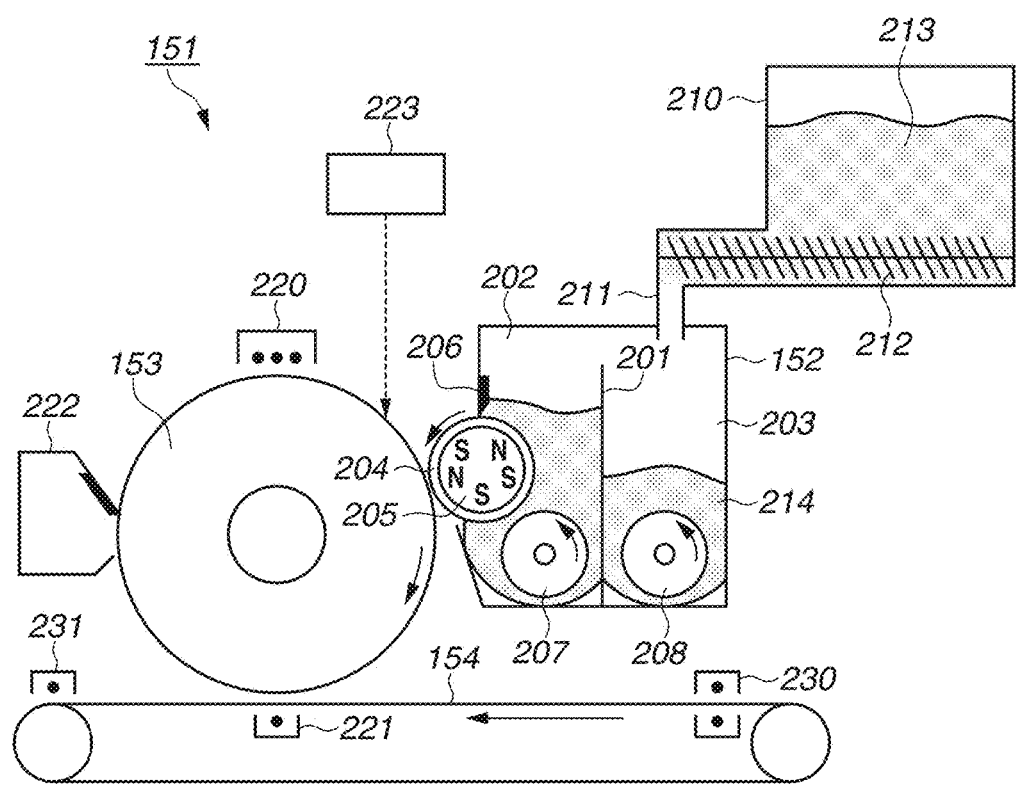
FIG. 2 is a sectional view illustrating a main part of an image forming unit.

FIG. 2 is a sectional view illustrating the main part of the image forming unit 151. The image forming unit 151 forms a toner image on the photosensitive drum 153 using toner contained in the developing device 152. A sheet fed from the sheet feeding unit 140 is conveyed to the photosensitive drum 153 by the transfer belt 154. The toner image formed on the photosensitive drum 153 is transferred onto the sheet conveyed to the transfer belt 154. The sheet having the toner image transferred thereto is conveyed to the fixing device 155 (see FIG. 1). The fixing device 155 fixes the toner image onto the sheet having the toner image transferred thereto by, for example, heating and pressing the sheet. Thus, printing of the image on the sheet ends.

The photosensitive drum 153 is a drum-shaped image-bearing member and rotates in a direction indicated by an arrow about a drum axis. A primary charger 220 that uniformly charges the front surface of the photosensitive drum 153, the developing device 152, a transfer charging device 221 for transferring a toner image onto a sheet, the transfer belt 154, and a drum cleaner 222 are arranged around the photosensitive drum 153. The image forming unit 151 includes an exposure device 223 that radiates a laser beam onto a part of the front surface of the photosensitive drum 153 at a position between the primary charger 220 and the developing device 152.

The exposure device 223 includes a semiconductor laser, a rotational polygon mirror, and a reflection mirror. The semiconductor laser outputs a laser beam according to image data. The laser beam output from the semiconductor laser scans the photosensitive drum 153 in the drum axis direction via the reflection mirror, the rotational polygon mirror, and the like. The exposure device 223 exposes the photosensitive drum 153 whose front surface is uniformly charged by the primary charger 220 to light according to the image data transferred from the controller 110. As a result, an electrostatic latent image corresponding to the image data is formed on the front surface of the photosensitive drum 153.

The developing device 152 develops the electrostatic latent image formed on the photosensitive drum 153, to thereby form a toner image. The inside of the developing device 152 is partitioned into a developing chamber 202 and an agitation chamber 203 by a partition wall 201. The developing chamber 202 stores a two-component developing agent including toner and magnetic carrier. The developing device 152 also includes a developing sleeve 204 on which a magnet 205 is fixedly disposed, and a blade 206. The developing sleeve 204 bears the developing agent contained in the developing chamber 202 by the magnetic force of the magnet 205. The blade 206 regulates the thickness of the developing agent borne by the developing sleeve 204 to a predetermined thickness. The rotation of the developing sleeve 204 conveys the developing agent borne by the developing sleeve 204 to a development position for developing the electrostatic latent image. In this way, the electrostatic latent image formed on the photosensitive drum 153 is developed. A development voltage is applied to the developing sleeve 204 from a power supply unit (not illustrated). As a result, a potential difference is generated between the developing sleeve 204 and the photosensitive drum 153. The toner contained in the developing agent borne by the developing sleeve 204 adheres to the electromagnetic latent image formed on the photosensitive drum 153, thereby visualizing the electrostatic latent image.

The developing chamber 202 and the agitation chamber 203 are provided with agitation screws 207 and 208, respectively. The agitation screws 207 and 208 agitate the developing agent contained in the developing chamber 202, thereby frictionally charging the developing agent in the developing chamber 202. The agitation screw 207 also has a function for supplying the developing agent contained in the developing chamber 202 to the developing sleeve 204. A toner replenishment tank 210 is connected to the agitation chamber 203, and toner 213 is supplied from the toner replenishment tank 210 through a toner discharge port 211. The agitation screw 208 agitates the toner 213 supplied into the agitation chamber 203 and the developing agent contained in the developing device 152. Thus, a toner density in the developing agent (ratio of the weight of the toner to the gross weight of the developing agent) is equalized.

The partition wall 201 is provided with passages for allowing the developing chamber 202 and the agitation chamber 203 to communicate with each other at front-side and back-side ends in FIG. 2. The two-component developing agent of which the toner density is decreased as a result of consuming the toner by development is conveyed to the agitation chamber 203 from the developing chamber 202 by the agitation screw 207 through one of the passages. The two-component developing agent of which the toner density is recovered in the agitation chamber 203 is conveyed from the agitation chamber 203 to the developing chamber 202 by the agitation screw 208 through the other one of the passages.

The transfer belt 154 is provided close to the photosensitive drum 153 at a position between the developing device 152 and the drum cleaner 222. The transfer belt 154 is an endless belt that rotates counterclockwise in FIG. 2 and is stretched around rollers. The transfer charging device 221 is provided at a position facing the photosensitive drum 153 across the transfer belt 154. Absorber chargers 230 are disposed so as to face each other across the transfer belt 154 and located at an upstream side of the transfer charging device 221 in the rotating direction of the transfer belt 154. A discharging charger 231 is disposed at an upstream side of the transfer charging device 221 in the rotating direction of the transfer belt 154.

The sheet fed from the sheet feeding unit 140 is conveyed to the transfer belt 154 and absorbed to the transfer belt 154 by the absorber charger 230. The sheet is conveyed by the rotation of the transfer belt 154. While the sheet passes between the photosensitive drum 153 and the transfer charging device 221, the toner image formed on the photosensitive drum 153 is transferred onto the sheet by the action of the transfer charging device 221. The sheet having the toner image transferred thereto is conveyed to the transfer belt 154 and is separated from the transfer belt 154 by the action of the discharging charger 231. After the sheet is separated from the transfer belt 154, the sheet is conveyed to the fixing device 155 and the toner image is fixed onto the sheet. Residual toner remaining on the photosensitive drum 153 after the transfer of the toner image onto the sheet is removed by the drum cleaner 222.

Figure 3:
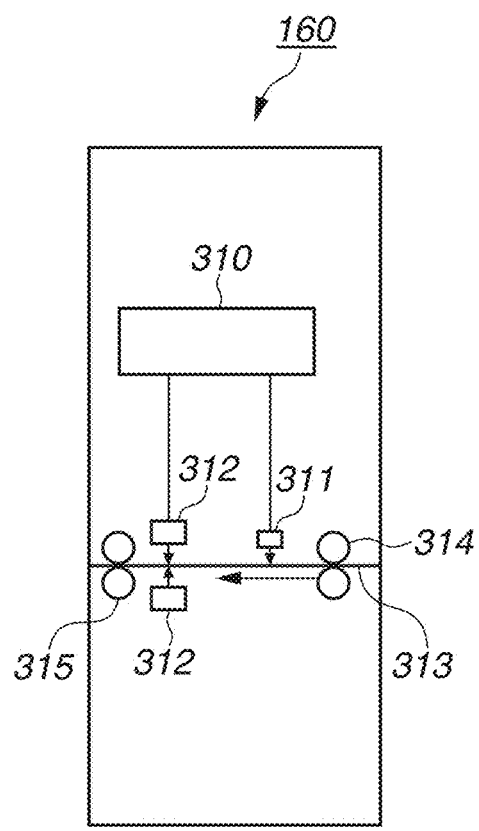
FIG. 3 is a configuration diagram illustrating a sensing device.

FIG. 3 is a configuration diagram illustrating the sensing device 160. The sensing device 160 includes a reading controller 310, a sheet detection sensor 311, and line sensors 312. The sensing device 160 reads the sheet on which a test image (hereinafter referred to as an "adjustment chart") is printed by the printer 150, while the sheet is conveyed along a conveyance path 313. Conveyance rollers 314 and 315 each function as a conveyance unit configured to convey the sheet on which the adjustment chart is printed along the conveyance path 313. Details of the adjustment chart will be described below. In the following description, the sheet on which the adjustment chart is printed is referred to as a test sheet.

Each of the sheet detection sensor 311 is an optical sensor including, for example, a light emitting portion and a light receiving portion. Each of the sheet detection sensor 311 detects a leading edge in the conveyance direction of the test sheet conveyed along the conveyance path 313. A plurality of sheet detection sensors 311 is provided in a direction orthogonal to the sheet conveyance direction. Each of the sheet detection sensors 311 detects a leading edge of each sheet, and notifies the reading controller 310 of a timing when the leading edge of the sheet is detected. The reading controller 310 derives the amount of skew feeding of the sheet based on the conveyance speed of the sheet and the timing when the leading edge of the sheet is detected by each of the sheet detection sensors 311.

The reading controller 310 controls the line sensors 312 to read the adjustment chart printed on the sheet. The adjustment chart is printed on, for example, both the front surface and the back surface of the sheet. Two line sensors 312 are provided at opposite sides of the conveyance path 313 to read the both surfaces of the sheet at once. The reading controller 310 transfers a skew angle of the sheet and read data by the line sensors 312 to the controller 110. The controller 110 detects a printed position (image formed position) of the adjustment chart on the sheet based on the skew angle of the sheet and the read data.

<Sheet Library>

FIG. 4 is an example diagram illustrating an interface screen for performing an operation, such as editing onto a sheet library, in the image forming apparatus 100 according to the present exemplary embodiment. The sheet library is a database for managing sheets that can be used for printing in the image forming apparatus 100. The sheet library is stored in, for example, the host computer 101 (server) that is connected to the image forming apparatus 100 via the network. Details of the sheet library will be described below.

The interface screen for operating the sheet library is displayed on the operation panel 120 of the image forming apparatus 100. An interface screen 400 includes a sheet list 410, an "add" button 420, an "edit" button 421, a "delete" button 422, and a "register" button 423.

In the sheet list 410, a sheet list for managing the sheet library is displayed. Sheet attribute information is displayed in columns 411 to 417. A sheet name is displayed in the column 411. The sheet name is information for identifying the type of each sheet. A sheet size is displayed in the columns 412 and 413. The column 412 represents a sheet length in a direction (sub-scanning direction) in which a sheet is conveyed, and the column 413 represents a sheet length in a direction (main scanning direction) orthogonal to the direction in which a sheet is conveyed. A sheet grammage is displayed in the column 414.

Information for a user to identify the surface property of each sheet is displayed in the column 415. The information for identifying the surface property of each sheet is information about the physical property of the front surface of each sheet. For example, when the sheet on which surface processing for increasing the glossiness is performed is registered in the sheet list 410, "coating" is displayed in the column 415. When the sheet on which concavo-convex processing is performed is registered in the sheet list 410, "emboss" is displayed in the column 415. When the sheet on which no special processing is performed is registered in the sheet list 410, "plain paper" is displayed in the column 415.

A sheet color is displayed in a column 416. Information for indicating automatic execution of a print position adjustment is displayed in the column 417. In the column 417 corresponding to the sheet on which the user has executed the print position adjustment, "allowed" is displayed. When the sheet for which "allowed" is displayed in the column 417 is registered in the sheet library, the image forming apparatus 100 executes the print position adjustment using a target sheet fed from the sheet feeding unit 140.

The sheet to be displayed can be selected from the sheet list 410 by a touch operation or the like on the operation panel 120. The sheet attribute of the selected sheet is highlighted to indicate that the sheet attribute is selected. A case where "XYZ COMPANY COLOR 81" is selected is herein illustrated. If the number of sheets managed in the sheet library is larger than the number of sheets that can be displayed at once in the sheet list 410, the sheet attribute can be displayed and selected by operating a scroll bar 418.

The "add" button 420 is a button for adding a new sheet in the sheet library. The "edit" button 421 is a button for editing the sheet attribute of the selected sheet in the sheet list 410. The "delete" button 422 is a button for deleting the sheet selected in the sheet list 410 from the sheet library. The "register" button 423 is a button for registering the type of each sheet stored in the containers.

When the "add" button 420 or the "edit" button 421 is pressed, the interface screen for inputting the sheet attribute is displayed on the operation panel 120 of the image forming apparatus 100. The interface screen for inputting the sheet attribute is described with reference to FIG. 5. An interface screen 500 includes text boxes 501, 502, 503, and 504, combo boxes 505 and 506, checkboxes 507 and 508, a display area 509, an "end edition" button 520, and a "cancel" button 521.

The text box 501 is an input area for inputting the name of each sheet (sheet name). The text box 502 is an input area for inputting the length of each sheet in the sub-scanning direction (sub-scanning direction sheet length). The text box 503 is an input area for inputting the length of each sheet in the main scanning direction (main scanning direction sheet length). The text box 504 is an input area for inputting a sheet grammage. The input to each of the text boxes 501 to 504 is performed by an input key or the like provided on a software keyboard or the operation panel 120.

The combo box 505 is an input area for inputting the surface property of each sheet. In the combo box 505, one of sheet surface properties is designated from a pull-down list of the sheet surface properties that are registered in advance and that can be used in the image forming apparatus 100. The combo box 506 is an input area for inputting the color of each sheet. In the combo box 506, one of the sheet colors is designated from a pull-down list of the colors registered in advance.

The checkbox 507 is an input area for designating whether the type of a sheet is a preprinted sheet. When the sheet is a preprinted sheet, the operator checks the checkbox 507. The checkbox 508 is an input area for designating whether to display a warning for the print position adjustment. When the checkbox 508 is checked, the column 417 on the interface screen 400 illustrated in FIG. 4 indicates "allowed". When the column 417 indicates "allowed", a warning for the print position adjustment as described below is displayed after the sheet is stored in the sheet feeding unit 140. An initial value of a time interval at which the warning for the print position adjustment is displayed is displayed in the display area 509. The time interval at which the warning for the print position adjustment is displayed is not allowed to be changed by the operator. The warning for the print position adjustment is displayed at the time interval according to the initial value.

When the "end edition" button 520 is pressed, the sheet attribute input at that time is determined and stored in the sheet library. The interface screen 500 is switched to the interface screen 400 illustrated in FIG. 4 after the sheet attribute is stored in the sheet library. When the "cancel" button 521 is pressed, editing of the sheet attribute is cancelled. When the "cancel" button 521 is pressed, the interface screen 500 is switched to the interface screen 400 illustrated in FIG. 4, without storing the sheet attribute in the sheet library.

FIG. 6 is a table illustrating the sheet library. The sheet library is stored in the storage 115 of the image forming apparatus 100 in a file format of, for example, an extensible markup language (XML) or comma-separated values (CSV). The sheet library can be read, written, or updated, as needed.

Rows 601 to 605 each represent the sheet attribute of each sheet registered in the sheet library. Columns 611 to 621 respectively represent items for sheet attributes. Each item is input via the interface screens 400 and 500 on the operation panel 120. The column 611 represents the name of each sheet. The columns 612 to 615 each represent the physical property of each sheet. The column 612 represents the sheet length in the sub-scanning direction of each sheet. The column 613 represents the sheet length in the main scanning direction of each sheet. The column 614 represents a sheet grammage. The column 615 represents the surface property of each sheet. The column 616 represents the color of each sheet. The column 617 represents whether the type of a sheet is a preprinted sheet.

The column 618 represents a print position shift amount on the front surface of each sheet, and the column 619 represents a print position shift amount on the back surface of each sheet. The print position shift amount is a value quantitatively indicating a shift between an ideal print area and a predicted print area that is predicted based on the result of reading the test image. The ideal print area has a rectangular shape having four sides of predetermined lengths. One side of the print area is parallel to a predetermined side of a sheet, and a distance between the predetermined side of the sheet and the one side of the print area parallel to the predetermined side is a predetermined distance.

The print position shift amount is represented by parameters such as a right-angle correction amount, a trapezoidal correction amount, a read position, a side position, a main-scanning magnification, and a sub-scanning magnification. The right-angle correction amount represents a shift amount of a squareness in the printing directions of the sub-scanning direction and the main scanning direction with respect to a sheet. For example, the right-angle correction amount is a shift amount between an ideal normal, which is calculated with respect to a straight line printed in the sub-scanning direction, and a straight line printed in the main scanning direction. The trapezoidal correction amount represents a shift amount due to expansion and contraction of a sheet. For example, the trapezoidal correction amount is a shift amount between a straight line printed in a range from a print start position on a sheet to a sub-scanning trailing edge of the sheet in the sub-scanning direction and a straight line printed in a range from the position of a main-scanning trailing edge of the sheet to the sub-scanning trailing edge of the sheet in the sub-scanning direction. The read position and the side position each represent a print position shift amount in each of the sub-scanning direction and the main scanning direction on a sheet.

The read position is adjusted by changing the print start position of an image that starts from a leading edge of a sheet in the sheet conveyance direction. The side position is adjusted by changing the print start position of an image that starts from a left edge of a sheet in the sheet conveyance direction. More specifically, the exposure device 223 adjusts an irradiation start timing of a laser beam to be radiated onto the photosensitive drum 153, thereby adjusting the read position and the side position. For example, the CPU 114 controls the exposure device 223 to adjust the irradiation start timing of the laser beam.

The sub-scanning direction magnification represents a shift in the length of an image in the sub-scanning direction (magnification for an ideal length). Specifically, the sub-scanning direction magnification is adjusted by controlling the rotational speed of the transfer belt 154. For example, the CPU 114 adjusts the rotational speed of a motor (not illustrated) that rotates the transfer belt 154. The main-scanning magnification represents a shift in the length of an image in the main scanning direction (magnification for an ideal length). Specifically, while modulating the laser beam based on the image data, the exposure device 223 controls the clock frequency of the laser beam to thereby adjust the main-scanning magnification. For example, the CPU 114 controls the exposure device 223 to thereby control the clock frequency. Alternatively, the CPU 114 may be configured to execute image processing on the image data so that an output image can be printed at an ideal print position. The image processing for printing the output image at the ideal print position is image processing such as affine transformation.

In actual printing, the controller 110 adjusts the print position based on the print position shift amount so that an image can be formed at an ideal print position. The controller 110 refers to the print position shift amount in the sheet library, and performs image processing on the image data so that the image can be printed at the ideal print position. Further, the controller 110 transfers the image data subjected to the image processing to the printer 150, and controls the image forming unit 151 to print the image on the target sheet based on the image data.

The initial value in each item of the print position shift amount is "0". When a sheet is newly registered in the sheet library, or when the print position adjustment is not carried out even though the sheet is registered, the initial value is used as the print position shift amount.

In this case, a time required until the print position shift amount exceeds an allowable amount varies depending on the type, size, grammage, surface property of each sheet. For example, a time required until the print position shift amount on a target sheet (sheet of interest) exceeds an allowable amount is obtained from a test result in a high-temperature/high-humidity environment and an experimental result in a low-temperature/low-humidity environment, and the time is preliminarily stored in the host computer 101 (server). The experimental result shows a temporal change in the length of a sheet due to change in humidity. Among the times exceeding the allowable amount that are obtained from the experimental result, a shortest time when the shift amount exceeds an allowable value ΔTH corresponds to an adjustment interval (column 620) for the print position adjustment of the sheet. The unit of the adjustment interval registered in the column 620 is "minutes".

In the experimental result described above, it was found that the amount of change in the length of the sheet decreased as the water content of the sheet approached the equilibrium state. The amount of expansion and contraction of the dimensions of the sheet converged to a saturated value depending on the type of the sheet. In other words, the relationship between the elapsed time and the amount of expansion and contraction of the sheet can be approximated by a logarithmic function. Accordingly, the image forming apparatus 100 executes the print position adjustment so that a time required from the print position adjustment previously executed until the print position adjustment is executed again increases as the time required after the sheet is stored in the container increases.

More specifically, the image forming apparatus 100 executes the print position adjustment after the operator stores a sheet in any one of the containers of the image forming apparatus 100. This corresponds to a first print position adjustment. After that, the image forming apparatus 100 executes a second print position adjustment after a lapse of time corresponding to the adjustment interval (column 620). Third and subsequent print position adjustments are executed after the adjustment interval (column 620) is updated based on the value obtained by multiplying an increasing rate (column 621) by the adjustment interval (column 620), and the time corresponding to the updated adjustment interval has elapsed. For example, when the value of the adjustment interval (column 620) is 10 and the value of the increasing rate (column 621) is 1.5, the third print position adjustment is executed after a lapse of 15 minutes since the second print position adjustment is executed. At this time, the value of the adjustment interval (column 620) is updated from 10 to 15. The increasing rate displayed in the column 621 is a value (rate) obtained based on the experimental result for each sheet.

In this way, the image forming apparatus 100 can execute the print position adjustment again before the print position shift amount on the sheet on which the print position adjustment has been executed exceeds the allowable amount again. Further, since the image forming apparatus 100 does not excessively execute the print position adjustment, the number of sheets to be used can be suppressed and a deterioration in the productivity due to the frequent execution of the print position adjustment by the image forming apparatus 100 can also be suppressed.

The amount of expansion and contraction of each sheet due to the absorption of moisture of the sheet varies depending on the environmental humidity. In the above description, it is proposed to set the shortest time in the experimental result as the initial adjustment interval (column 620) of the print position. However, the adjustment interval may be determined by another method. For example, the environmental sensor 141 of the sheet feeding unit 140 may acquire the temperature and humidity of the ambient environment of the sheet feeding unit 140, to thereby obtain an optimum print position adjustment interval based on the temperature and humidity of the ambient environment.

<Print Position Adjustment>

Figure 7:
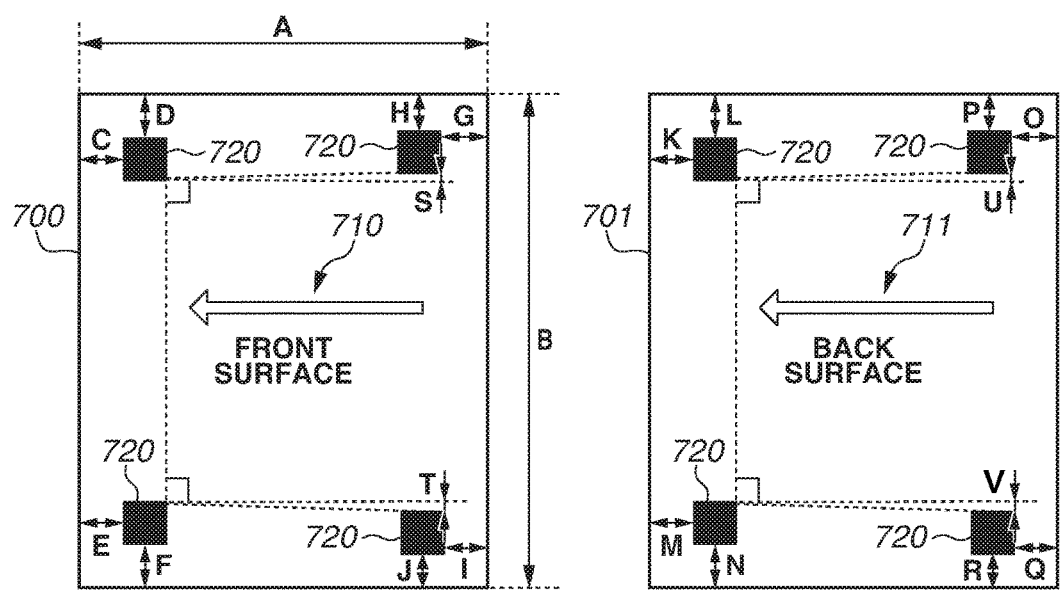
FIG. 7 is a diagram illustrating a test sheet.

FIG. 7 is a schematic view illustrating a test sheet. The adjustment chart on the test sheet is printed on the sheet by the printer 150. The same adjustment chart is printed on a front surface 700 and a back surface 701 of a sheet.

An image 710 is an arrow and text printed on the front surface 700, and is used for identifying the conveyance direction and the front and back surfaces of the test sheet. An image 711 is an arrow and text printed on the back surface 701, and is used for identifying the conveyance direction and the front and back surfaces of the test sheet. When the test sheet is read by the sensing device 160, the images 710 and 711 are printed so as to prevent the operator from setting the sheet in a wrong direction. The images 710 and 711 need not necessarily be printed on the sheet, because the images are not directly related to the derivation of the print position shift amount.

Marks 720 are images printed at specific positions in the adjustment chart. The marks 720 are each formed in a color with a large difference in reflectance with respect to the sheet. In the present exemplary embodiment, the marks 720 are each formed in black. In the present exemplary embodiment, the marks 720 are formed at eight positions at four corners of each of the front surface 700 and the back surface 701 of the sheet. The marks 720 are each formed at a location at a predetermined distance from each edge of the sheet, when the print position is an ideal position. The print position shift amount is derived by obtaining the distance from each edge of the test chart to an edge of each mark 720. In the present exemplary embodiment, distances A to V illustrated in FIG. 7 are measured. The distance A corresponds to the length of the test sheet in the sub-scanning direction. The distance B corresponds to the length of the test sheet in the main scanning direction. The ideal length of each of the distances A and B is a sheet length set in the sheet library. Each of the distances C to V corresponds to a length from each mark 720 to a nearest edge of the sheet.

Processing for deriving the print position shift amount based on the measured distances A to V will be described. FIG. 8 is a table illustrating the processing for deriving the print position shift amount.

The print position shift amount is represented by items for the front surface of a sheet and items for the back surface of the sheet. The items for the front surface include a read position 801, a side position 802, a main-scanning magnification 803, a sub-scanning magnification 804, a right-angle correction amount 805, and a trapezoidal correction amount 806. The items for the back surface include a read position 807, a side position 808, a main-scanning magnification 809, a sub-scanning magnification 810, a right-angle correction amount 811, and a trapezoidal correction amount 812. On the front surface and the back surface, a measured value 820 and a print position shift amount 822 are calculated by similar formulas for the same item, and the same ideal value is set for the same item.

The measured value 820 in each item is calculated by a formula set for each item based on the measured values of the distances A to V described above with reference to FIG. 7. The measured value 820 of the read position 801 (807) is an average value of the distances C and E (K and M) from a leading edge of the sheet in the conveyance direction to the corresponding mark 720. The measured value 820 of the side position 802 (808) is an average value of the distances F and J (N and R) from a left edge of the sheet in the conveyance direction to the corresponding mark 720. The measured value 820 of the main-scanning magnification 803 (809) is an average value of the distances between the marks 720 aligned in the main scanning direction. The measured value 820 of the sub-scanning magnification 804 (810) is an average value of the distances between the marks 720 aligned in the sub-scanning direction. The measured value 820 of the right-angle correction amount 805 (811) is an average value of shift amounts S and T (U and V) in the sub-scanning direction of the marks 720, which are located at a trailing edge in the reading direction, with respect to a normal to a straight line connecting the marks 720 aligned on the same scanning line in the main scanning direction on the leading edge side of the sheet in the reading direction. The measured value 820 of the trapezoidal correction amount 806 (812) is a difference between the distances between the marks 720 aligned on the same scanning line in the sub-scanning direction.

An ideal value 821 in each item is a value obtained based on each mark 720 formed at a position away from an edge of the sheet by 1 [cm]. The ideal value 821 of each of the read position 801 (807) and the side position 802 (808) is 1 [cm]. The ideal value 821 of the main-scanning magnification 803 (809) is a value obtained by subtracting 2 [cm] from the sheet length in the main scanning direction of the sheet registered in the sheet library. The ideal value 821 of the sub-scanning magnification 804 (810) is a value obtained by subtracting 2 [cm] from the sheet length in the sub-scanning direction of the sheet registered in the sheet library. The ideal value 821 of each of the right-angle correction amount 805 (811) and the trapezoidal correction amount 806 (812) is 0 [cm].

The print position shift amount 822 in each item is calculated using the formula set for each item based on the corresponding measured value 820 and ideal value 821. The print position shift amount 822 of each of the read position 801 (807) and the side position 802 (808) is calculated by subtracting the ideal value 821 from the measured value 820 (in units of mm). The print position shift amount 822 of each of the main-scanning magnification 803 (809) and the sub-scanning magnification 804 (810) is calculated by dividing the value obtained by subtracting the ideal value 821 from the measured value 820 by the ideal value (in units of %). The measured value 820 is directly used as the print position shift amount 822 of each of the right-angle correction amount 805 (811) and the trapezoidal correction amount 806 (812). The calculated print position shift amount 822 in each item is stored in the sheet library.

The distances A to V can be calculated based on the result of measurement by the operator using a ruler or the like, or the result of reading the test sheet by the scanner 130. In the present exemplary embodiment, a method for measuring the distances A to V by using the sensing device 160 provided in the image forming apparatus 100 will be described.

The sensing device 160 reads the adjustment chart on the test sheet. In the sensing device 160, the line sensors 312 scan the test sheet conveyed along the conveyance path 313. The sensing device 160 detects an edge of each mark 720 (boundary between the background of the sheet and the mark 720) based on a density difference of the image obtained by scanning. The distances A to V are calculated based on the detected edge of each mark 720 and each edge of the sheet.

Next, the print position adjustment to be executed by the controller 110 will be described. The operator performs a registering operation for each sheet stored in the containers of the sheet feeding unit 140 so as to cause the image forming apparatus 100 to execute the print position adjustment. The operator uses the operation panel 120 to select the container in which the sheet is stored, and selects the sheet stored in the selected container from the sheet library. Alternatively, the operator selects a sheet to be stored in the container selected from the sheet library. The sheet library includes a checkbox for allowing the execution of the print position adjustment. The operator checks the checkbox corresponding to the sheet on which the print position is to be adjusted.

The print position adjustment will be described below with reference to a flowchart of FIG. 9. The CPU 114 loads a program stored in the ROM 112 and executes the program during a period in which a main power supply of the image forming apparatus 100 is turned on.

In step S1001, the CPU 114 acquires the adjustment interval (column 620) for a print position automatic adjustment included in the database illustrated in FIG. 6. In step S1002, the CPU 114 determines whether a sheet is present in the container of the sheet feeding unit 140, by using a sheet sensor (not illustrated) provided on the sheet feeding unit 140. If a sheet is present in the sheet feeding unit 140 (YES in step S1002), the processing proceeds to step S1003. In step S1003, the CPU 114 checks a time (elapsed time) during which the sheet is stored in the container. The CPU 114 uses a counter (not illustrated), to count the elapsed time after the print position adjustment is previously executed, and the CPU 114 acquires the counter value as the elapsed time. The CPU 114 sets the count value of the counter to "0" upon execution of the print position adjustment.

On the other hand, if no sheet is present in the sheet feeding unit 140 (NO in step S1002), the automatic execution sequence is terminated without executing the print position automatic adjustment. In step S1004, the CPU 114 compares the adjustment interval (column 620) of the print position with the time (elapsed time) during which the sheet is stored.

If the elapsed time exceeds the adjustment interval (column 620) (YES in step S1004), the processing proceeds to step S1005. In step S1005, the CPU 114 executes the print position adjustment. Further, the CPU 114 stores the print position shift amounts (column 618 and column 619) in the database illustrated in FIG. 6. The print position adjustment is described with reference to FIG. 10 described below. If the elapsed time does not exceed the adjustment interval (column 620) of the print position (NO in step S1004), the processing returns to step S1001. The CPU 114 repeats the processing from step S1001 to step S1004 until the elapsed time exceeds the adjustment interval (column 620), or until there is no sheet in the container.

After executing the print position adjustment, the CPU 114 acquires the adjustment interval (column 620) of the print position and the increasing rate (column 621) on the database in step S1006, and updates the adjustment interval of the next print position. At this time, the CPU 114 stores the initial value of the adjustment interval of the print position in a prepared area (not illustrated) in the database, so as to save the initial value. In step S1006, the CPU 114 obtains the adjustment interval of the next print position by multiplexing the adjustment interval (column 620) of the print position by the increasing rate (column 621). The adjustment interval of the print position and the increasing rate are determined based on the experimental result, but instead may be input from a user.

Figure 10:
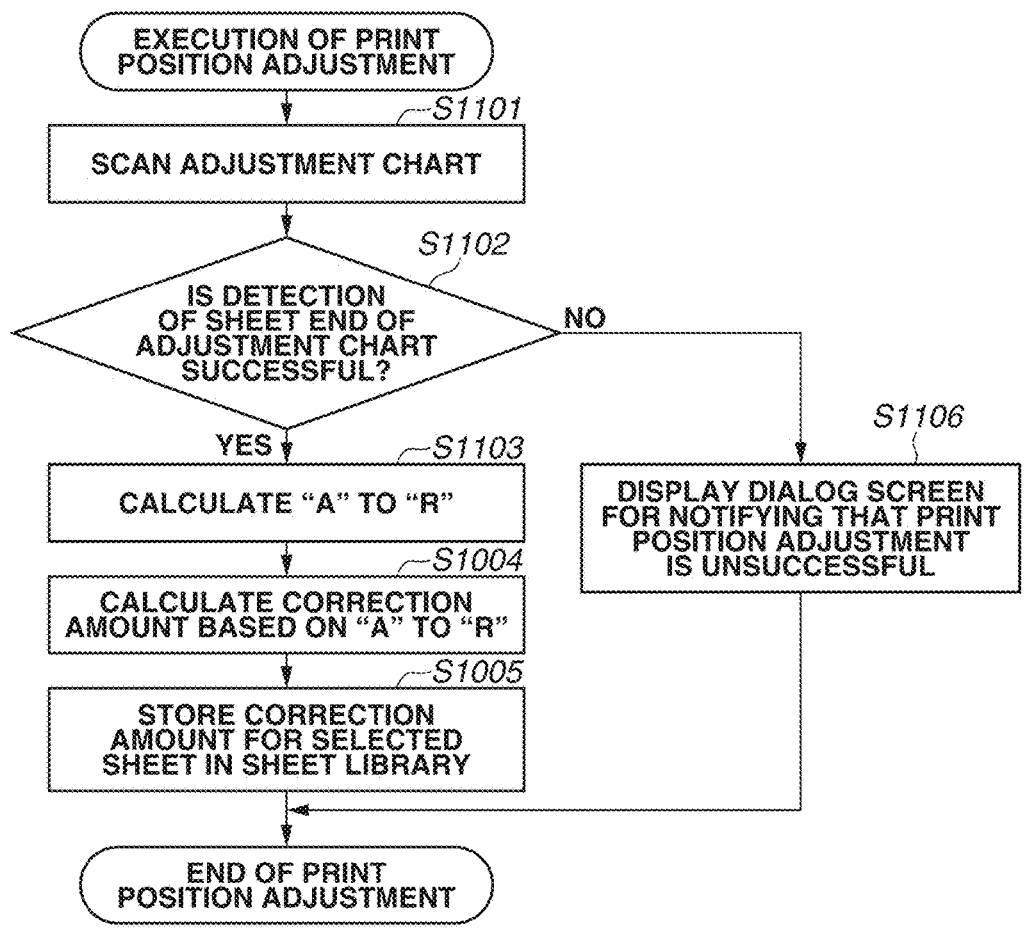
FIG. 10 is a flowchart illustrating an acquisition sequence for acquiring a print position shift amount.

Next, a method in which the image forming apparatus 100 prints a test sheet and determines an image forming condition for correcting the print position based on the result of reading the test sheet by the sensing device 160 will be described with reference to the flowchart of FIG. 10.

When a timing for executing the print position adjustment is reached during formation of an image based on a print job, the CPU 114 stops the image forming processing to execute the print position adjustment. In step S1101, the CPU 114 controls the image forming apparatus 100 to feed a target sheet (sheet of interest) from the container, and causes the printer 150 to print the adjustment chart on the target sheet. In this way, the test sheet on which the markers as illustrated in FIG. 7 are printed is created. The CPU 114 controls the conveyance rollers 314 and 315 to convey the test sheet to the sensing device 160. The reading controller 310 reads the both surfaces of the test sheet conveyed by the conveyance rollers 314 and 315, and transfers the read data to the controller 110. The processing performed in step S1101 corresponds to acquisition processing for acquiring information about the image forming position of each mark on the sheet of interest.

In step S1102, the CPU 114 analyzes the read data and extracts the distance from an edge of the test sheet to the test image. If the detection of the sheet edge is successful (YES in step S1102), the processing proceeds to step S1103. In step S1103, the lengths indicated by "A" to "V" in FIG. 7 are obtained. In step S1104, each correction amount is calculated based on the formulas illustrated in FIG. 8. In step S1105, the correction amount for the print position adjustment for each of the selected sheets illustrated in FIG. 4 is stored in the sheet library illustrated in FIG. 6. The CPU 114 updates the print position shift amounts (column 618 and column 619) in the sheet library, and then terminates the print position adjustment. When the CPU 114 executes the print position adjustment during the print job, the CPU 114 resumes the formation of the image based on the print job after the print position adjustment is terminated.

On the other hand, if the detection of the edge of the test sheet in the sensing device 160 is unsuccessful (NO in step S1102), the processing proceeds to step S1106. In step S1106, the CPU 114 displays a dialog for notifying that the print position adjustment is unsuccessful on the touch panel. This dialog need not necessarily be displayed depending on the setting, as long as information indicating that the print position adjustment is unsuccessful is recorded, for convenience of the user. Then, the CPU 114 terminates the print position adjustment without updating the print position shift amounts (column 618 and column 619). When the CPU 114 executes the print position adjustment during the print job, the CPU 114 resumes the formation of the image based on the print job after the print position adjustment is terminated.

Figure 11:
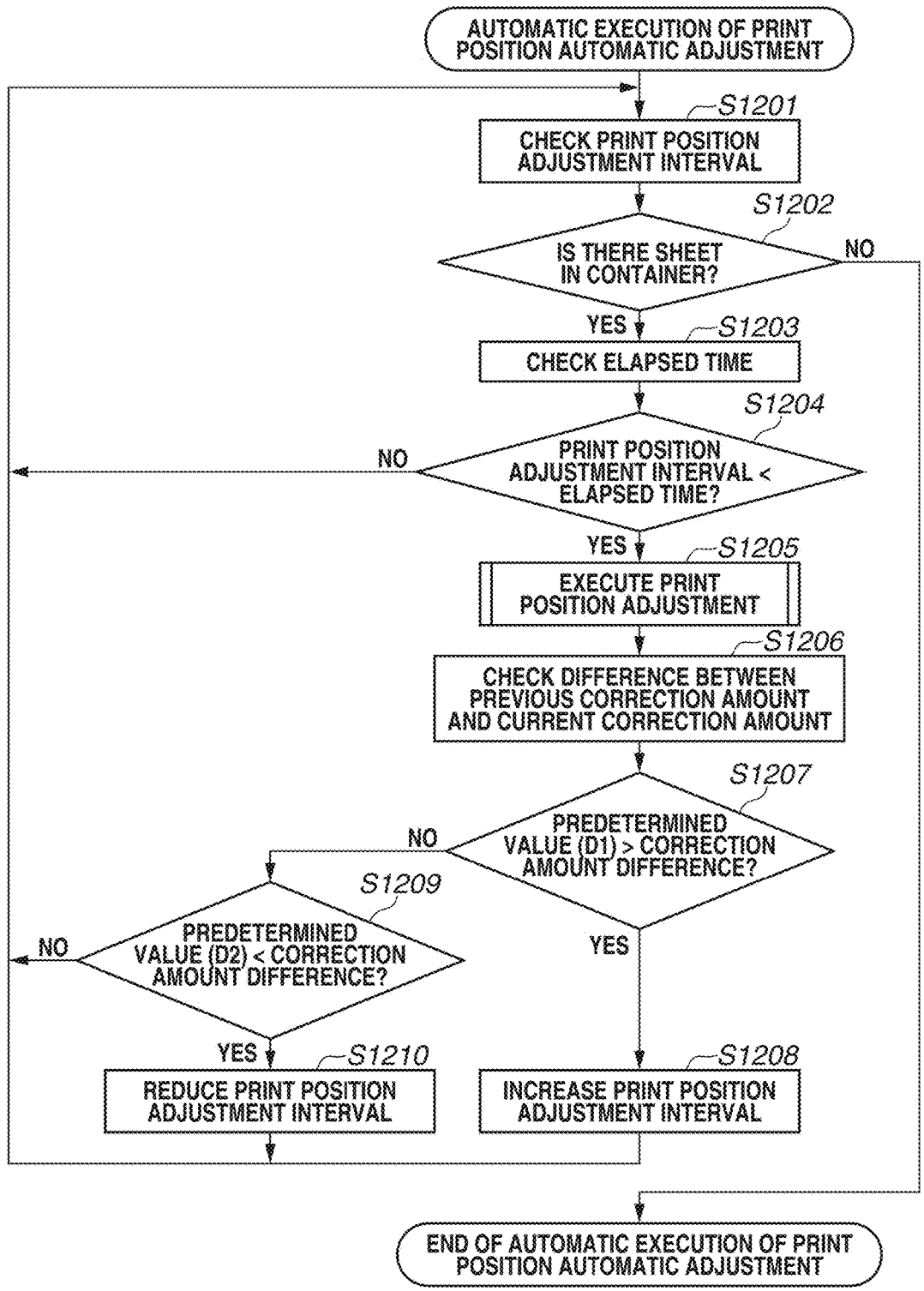
FIG. 11 is a flowchart illustrating an operation according to a modified example of a print position adjustment.

Next, a modified example of the print position adjustment will be described with reference to a flowchart of FIG. 11. Processing from step S1201 to step S1205 illustrated in FIG. 11 is similar to the processing from step S1001 to step S1105 described above, and thus descriptions thereof are omitted.

In step S1206, the CPU 114 calculates a difference between the previous shift amount and the current shift amount. Further, in step S1207, the CPU 114 determines whether the difference between the print position shift amounts is smaller than a predetermined value D1. As the difference between the water content of a sheet and the water content in the air decreases, a change in the amount of expansion and contraction of the sheet also decreases. Accordingly, as the difference between the water content of the sheet and the water content in the air decreases, the difference between the previous print position shift amount and the current print position shift amount also decreases. Therefore, if the difference between the previous print position shift amount and the current print position shift amount is smaller than the predetermined value D1 (YES in step S1207), the processing proceeds to step S1208. In step S1208, the CPU 114 further increases the adjustment interval of the next print position adjustment. Thus, the image forming apparatus 100 can further suppress the number of sheets to be used and further suppress the occurrence of down time.

On the other hand, if the difference between the print position shift amounts is larger than the predetermined value D1 (NO in step S1207), the processing proceeds to step S1209. In step S1209, the CPU 114 determines whether the difference between the print position shift amounts is larger than a predetermined value D2 in step S1209. As the difference between the water content of a sheet and the water content in the air increases, a change in the amount of expansion and contraction of the sheet may increase. Accordingly, as the difference of the water content of the sheet and the water content in the air increases, the difference between the previous print position shift amount and the current print position shift amount also increases. Therefore, if the difference between the previous print position shift amount and the current print position shift amount is larger than the predetermined value D2 (YES in step S1209), the processing proceeds to step S1210. In step S1210, the CPU 114 reduces the adjustment interval. Thus, even if a rapid change in ambient environment occurs, the adjustment interval can be changed to an appropriate adjustment interval and the adjustment for setting an accurate print position can be made.

In addition, the predetermined values D1 and D2 are determined based on the experimental results for each sheet in the high-temperature/high-humidity environment and the low-temperature/low-humidity environment. The predetermined values D1 and D2 may be set, for example, by the operator using the operation panel.

Figure 12:
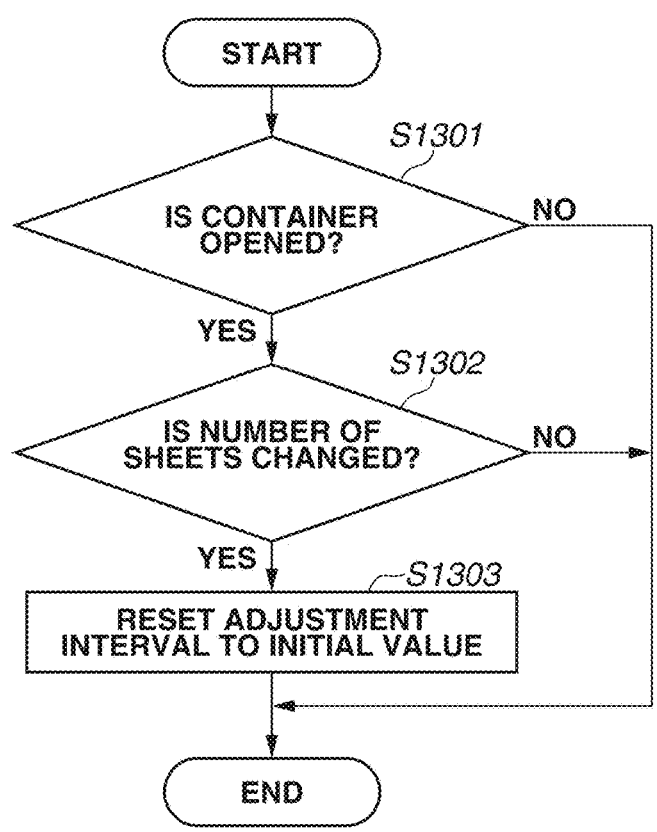
FIG. 12 is a flowchart illustrating an adjustment interval initialization sequence.

FIG. 12 illustrates an operation flow of a printing apparatus for checking a change in a sheet fed from the sheet feeding unit and changing the adjustment interval of the print position. This flow is processed in parallel with the execution determination of the print position adjustment described above. This flow is repeatedly executed until the main power supply of the image forming apparatus 100 is turned off after the main power supply is turned on. The sheet feeding unit 140 includes an open/close detection sensor for detecting an open or closed state of the container, and a number-of-sheet sensor for detecting the number of sheets stored in the container. In step S1301, the CPU 114 determines whether the container of the sheet feeding unit 140 is opened, based on the detection result of the open/close detection sensor.

If the state of the container is changed from the closed state to the open state (YES in step S1301), the processing proceeds to step S1302. In step S1302, the CPU 114 determines whether the number of sheets stored in the container is changed after the container is closed, based on the detection result of the number-of-sheet sensor. If the operator increases the number of sheets by adding sheets to the container (YES in step S1302), the processing proceeds to step S1303. In step S1303, the adjustment interval is changed to the initial value. If the number of sheets stored in the container is changed (No in step S1302), the processing of the flowchart is ended. In this case, sheets having different water contents may be stacked on the sheets stored in the container. Accordingly, the CPU 114 changes the adjustment interval to the initial value. Thus, even when the operator adds new sheets to the container, the print position adjustment can be executed at an appropriate adjustment interval. In addition, a value stored in a prepared area (not illustrated) in the database is used as the initial value of the adjustment interval of the print position adjustment.

Figure 13:
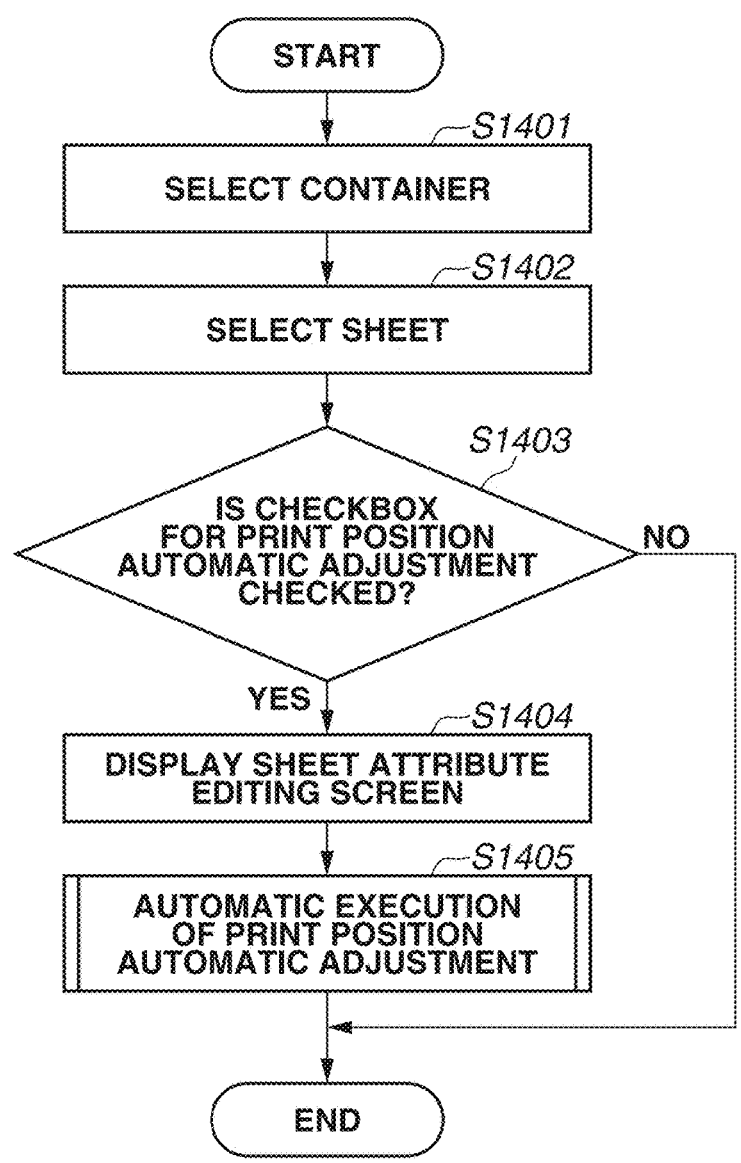
FIG. 13 is a flowchart illustrating adjustment interval editing processing.

In the exemplary embodiments described above, in order to change the adjustment interval, it is necessary to edit the adjustment interval in advance before a sheet is registered in the sheet library. Editing processing for changing the initial value of the adjustment interval after the sheet attribute information is registered in the sheet library will be described below with reference to FIG. 13.

The CPU 114 automatically executes the print position adjustment when the checkbox for the print position adjustment is checked on the interface screen illustrated in FIG. 5. When the sheet stored in the container is a sheet to be subjected to the print position adjustment, the CPU 114 displays a dialog for customizing the print position adjustment to cause the operator to set the adjustment interval and the like.

In step S1401, the CPU 114 acquires information about the container of the sheet feeding unit 140 selected by the operator at the time of registering the sheet. In step S1402, the CPU 114 displays the interface screen (see FIG. 4) for the sheet library on the operation panel, and allocates the sheet (sheet of interest) selected by the operator to the sheet feeding unit 140. In step S1403, the CPU 114 determines whether the checkbox corresponding to the sheet selected by the operator is checked. If the checkbox is not checked (NO in step S1403), the CPU 114 terminates the flow.

On the other hand, if the checkbox is checked (YES in step S1403), the processing proceeds to step S1404. In step S1404, the CPU 114 causes the operation panel to display a screen for editing the sheet attribute information so that the operator can set the adjustment interval. This enables the operator to check the adjustment interval of the print position and customize the adjustment interval depending on the climate under which printing is performed, a printing environment, and a printing status. The CPU 114 stores the adjustment interval set on the editing screen in the sheet library. The subsequent operation is similar to the operation of the image forming apparatus 100 described above, and thus the description thereof is omitted.

The CPU 114 described in the present exemplary embodiment is configured to execute the print position adjustment if the elapsed time exceeds the adjustment interval (column 620). However, the CPU 114 may be configured to issue a notification for prompting the execution of the print position adjustment if the elapsed time exceeds the adjustment interval (column 620). For example, the CPU 114 displays a message for prompting the execution of the print position adjustment on the operation panel 120. When the operator instructs to execute the print position adjustment after checking the notification, the CPU 114 executes the print position adjustment. According to this configuration, when the operator desires to continue printing in the image forming apparatus without executing the print position adjustment, the down time of the image forming apparatus can be suppressed.

According to the image forming apparatus described in the present exemplary embodiment, the print position adjustment can be executed at an appropriate timing.

Another exemplary embodiment for executing the execution determination of the print position adjustment will be described now. Note that in the following description, components of the present exemplary embodiment that are similar to those of the exemplary embodiment described above are denoted by the same reference numerals and descriptions thereof are omitted. FIG. 14 (consisting of FIGS. 14A and 14B) is a table illustrating a sheet library according to the present exemplary embodiment. In the sheet library illustrated in FIG. 14, the columns 611 to 622 represent items for sheet attributes. Each item is input via the interface screens 400 and 500 displayed on the operational panel 120.

The column 622 represents information indicating whether to display a warning for the print position adjustment. When the operator instructs to display the warning for the print position adjustment using the checkbox 508 (see FIG. 5), the information in the column 622 indicates "allowed".

Figure 15:
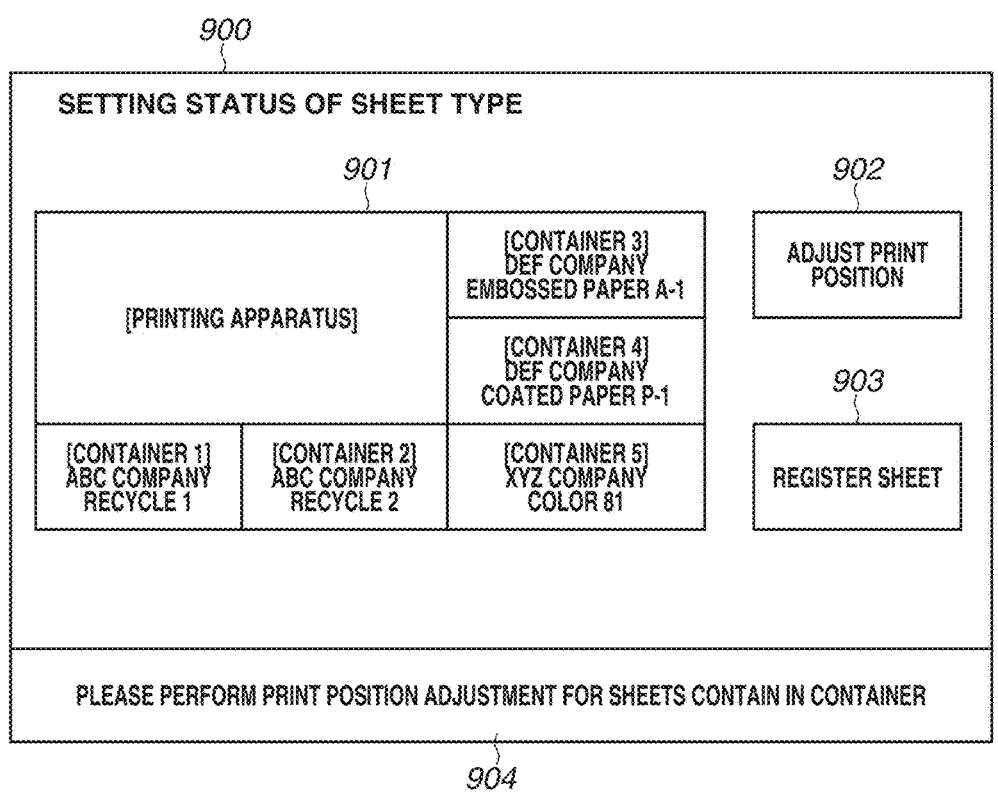
FIG. 15 is an example diagram illustrating a display screen for displaying a sheet setting status.

FIG. 15 is a diagram illustrating a display screen for displaying a sheet setting status displayed on the operation panel 120 of the image forming apparatus 100. The display screen 900 includes a sheet setting status 901 of each container, an "adjust print position" button 902, a "register sheet" button 903, and a warning message display area 904.

As the sheet setting status 901 of each container, the type of each sheet registered and stored in each container is displayed. In the example of FIG. 15, sheets of "ABC COMPANY RECYCLE 1", "ABC COMPANY RECYCLE 2", "DEF COMPANY EMBOSSED PAPER A-1", "DEF COMPANY COATED PAPER P-1", and "XYZ COMPANY COLOR 81" are respectively registered in five containers. The display of each container can be selected by an operation such as a touch operation. When the "adjust print position" button 902 is pressed after the selection of the container, the print position adjustment corresponding to the sheet in the selected container is performed. By the print position adjustment, the print position shift amount (column 822) illustrated in FIG. 8 is adjusted.

The "register sheet" button 903 is a button for registering the type of each sheet in the selected container. When the "register sheet" button 903 is pressed, the interface screen 400 illustrated in FIG. 4 is displayed on the operation panel 120. When the "register" button 423 on the interface screen 400 is pressed, the sheet type selected from the sheet list 410 illustrated in FIG. 4 is registered in the container selected from the sheet setting status 901 of each container illustrated in FIG. 15. The "adjust print position" button 902 and the "register sheet" button 903 are configured in such a manner that the buttons cannot be pressed when no container is selected from the sheet setting status 901 of each container.

The warning message display area 904 is a display area for presenting a warning message to the operator. When a warning message is present, the message is displayed in the warning message display area 904. When no warning message is present, no message is displayed in the warning message display area 904.

Figure 16:
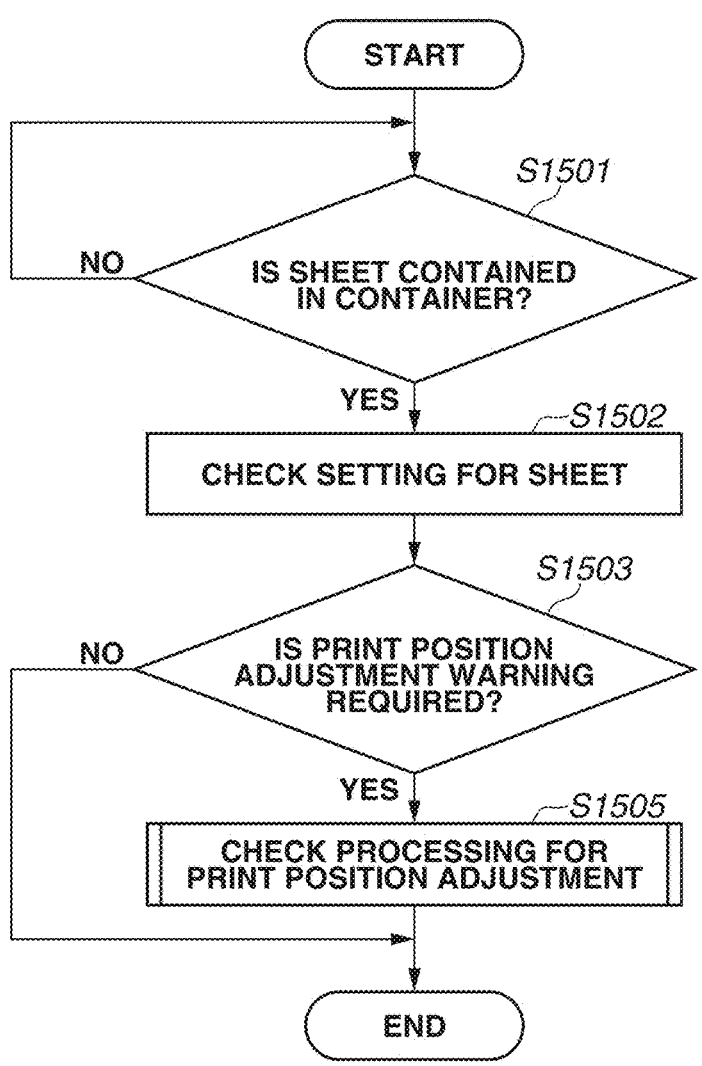
FIG. 16 is a flowchart illustrating warning display processing for print position adjustment.

FIG. 16 is another flowchart illustrating processing for performing a warning display for the print position adjustment. This processing is executed on a sheet selected by the operator from the sheet list 410 on the interface screen 400 illustrated in FIG. 4, when the checkbox 508 on the interface screen 500 illustrated in FIG. 5 is checked. When the checkbox 508 is checked, the CPU 114 displays the warning display for the print position adjustment on the operation panel 120. This is a warning display for the print position adjustment that is performed after the operator stores sheets in the sheet feeding unit 140, and is independently carried out for each of the five containers of the sheet feeding unit 140.

In step S1501, the CPU 114 determines whether a sheet is stored in the container. If a sheet is stored in any one of the containers (YES in step S1501), the processing proceeds to step S1502. In step S1502, the CPU 114 checks the value of the column 622 corresponding to the type of the sheet stored in the container from the sheet library (see FIG. 6). When the operator registers the stored sheet when the sheet is stored in the container. The CPU 114 checks the value of the column 622 corresponding to the registered sheet from the sheet library. The CPU 114 can check whether the warning display for the print position adjustment of the sheet stored in the container is required, based on the value of the column 622.

If the value of the column 622 indicates "allowed", the CPU 114 determines that the warning display for the print position adjustment of the sheet stored in the container is required (YES in step S1503), and the processing proceeds to step S1505. In step S1505, the CPU 114 performs check processing for the print position adjustment. If the value of the column 622 does not indicate "allowed" (NO in step S1503), the check processing for the print position adjustment ends, and the CPU 114 terminates the processing for performing the warning display for the print position adjustment.

Figure 17:
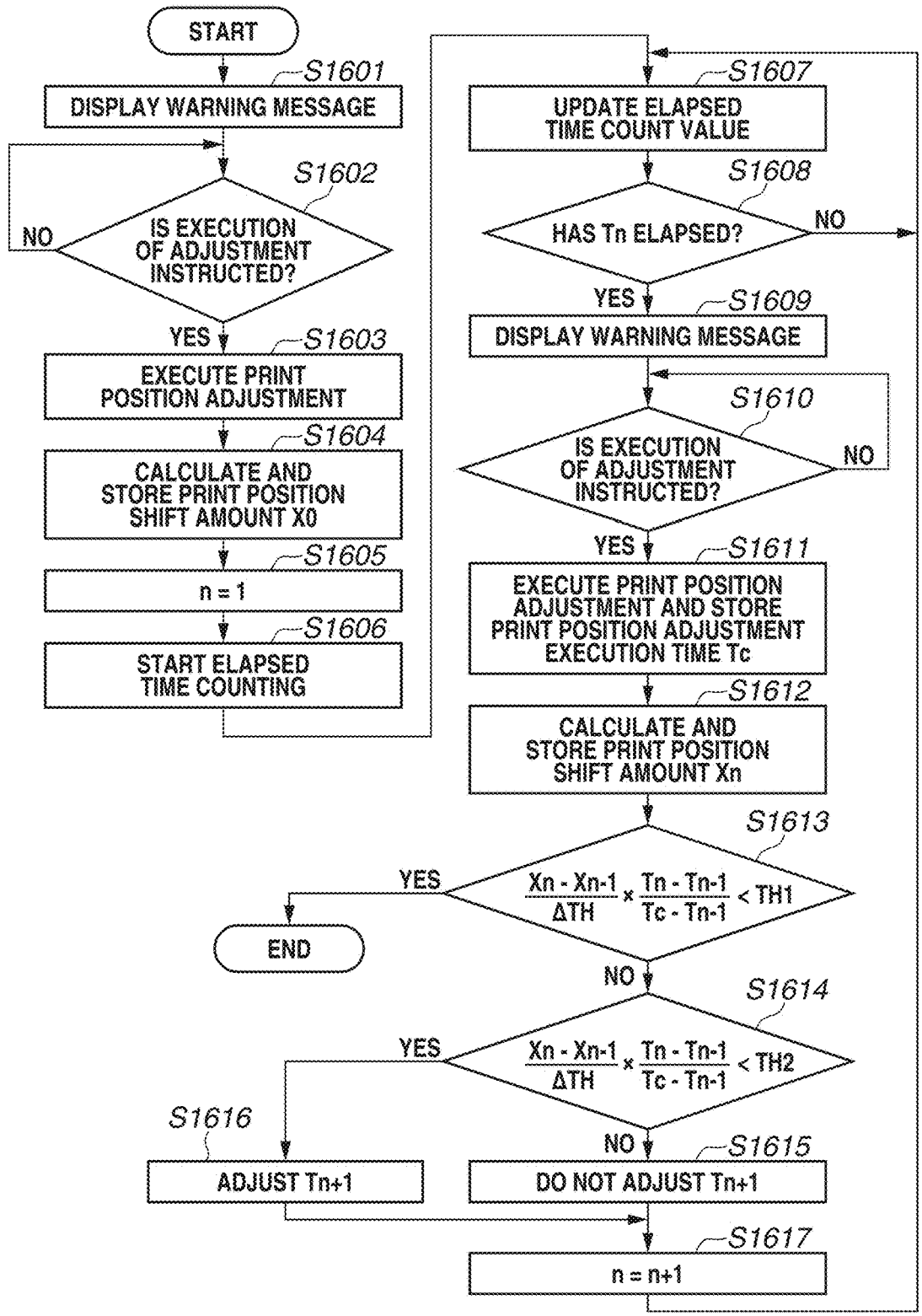
FIG. 17 is a flowchart illustrating check processing of print position adjustment.

FIG. 17 is a flowchart illustrating the check processing for the print position adjustment in step S1505.

When the check processing for the print position adjustment is started, in step S1601, the CPU 114 displays a warning message for the print position adjustment on the warning message display area 904 (see FIG. 15). For example, when sheets are stored in a "container 5", as illustrated in FIG. 15, the CPU 114 displays a warning message "Please perform print position adjustment for sheets stored in the container 5" in the warning message display area 904.

After displaying the warning message, in step S1602, the CPU 114 stands by until the "adjust print position" button 902 is pressed. If the "adjust print position" button 902 is pressed (YES in step S1602), the processing proceeds to step S1603. In step S1603, the CPU 114 prints the adjustment chart illustrated in FIG. 7 on the sheet stored in the container, and executes the print position adjustment, and executes the print position adjustment. In step S1604, the CPU 114 derives the print position shift amount on the sheet, and stores the derived print position shift amount in the sheet library in the RAM 113 as a print position shift amount X0. In step S1605, the CPU 114 stores the print position shift amount X0 and then secures a storage area for a variable n (n is an integer) in the RAM 113 and sets "1" as the variable n.

In step S1606, the CPU 114 sets a predetermined 0th time (T0) and a first time (T1), and starts counting an elapsed time. The storage area for the variable for counting the elapsed time is secured in the RAM 113 and initialized with "0". The CPU 114 initializes the variable for counting the elapsed time. In step S1607, the CPU 114 updates the count value every second. In step S1608, the CPU 114 determines whether an n-th time (Tn) has elapsed every time the count value is updated. The CPU 114 updates the count value until the count value reaches the n-th time (Tn) (NO in step S1608).

The n-th time (Tn) will be described. The n-th time (Tn) is a time when the warning message is displayed. In the present exemplary embodiment, the first time (T1) is a time interval (column 620 in FIG. 6) for displaying a warning for the print position adjustment. Assuming that a time interval for displaying a warning for the print position adjustment is represented by WT, the first time (T1) is expressed by the following equation.

$$\text{first time } (T1) = (\text{print position adjustment execution time } Tc) + WT \quad (1)$$

A time interval for displaying a second warning is derived from the time interval for displaying the warning for the print position adjustment and the increasing rate. Assuming that the increasing rate is represented by "α", the second time (Tn) is expressed by the following equation.

$$\text{second time } (Tn) = (\text{print position adjustment execution time } Tc) + \alpha \times WT \quad (2)$$

For example, when the type of the sheet stored in the "container 5" is "XYZ COMPANY COLOR 81", the time interval for displaying the warning for the print position adjustment is "15" as expressed as WT=15 (min). In the case of using the "XYZ Paper colored paper 81", the increasing rate is "2.0", and thus "α" is "2.0" (see FIG. 6).

If the n-th time (Tn) has elapsed (YES in step S1608), the processing proceeds to step S1609. In step S1609, the CPU 114 displays the warning message for the print position adjustment again in the warning message display area 904. If the "adjust print position" button 902 is pressed after the warning message is displayed (YES in step S1610), the processing proceeds to step S1611. In step S1611, the CPU 114 prints the adjustment chart illustrated in FIG. 7 on the sheet stored in the container, and executes the print position adjustment. The CPU 114 executes the print position adjustment and stores the print position adjustment execution time Tc in the RAM 113. In step S1612, the CPU 114 derives the print position shift amount on the sheet by executing the print position adjustment, and stores the derived print position shift amount in the sheet library and stores the print position shift amount in the RAM 113 as a print position shift amount Xn. Thus, the print position shift amounts X0 to Xn are stored in the RAM 113.

The CPU 114 divides a difference between the print position shift amount Xn stored in the RAM 113 and a print position shift amount Xn−1 by a print position shift allowable value ΔTH, thereby normalizing changes of print position shift amounts of (n−1)th and n-th print position shift amounts. Further, the CPU 114 converts the normalized change of the print position shift amount into a change per time interval of the n-th time (Tn) and an (n−1)th time (Tn−1) based on (n−1)th and n-th print position adjustment execution times, thereby calculating an index value. More specifically, the CPU 114 calculates the index value by $\{(Xn-X(n-1))/\Delta TH\} \times \{(Tn-Tn-1)/(Tc-Tn-1)\}$ based on the print position shift amount Xn and the print position shift amount Xn−1. In step S1613, the CPU 114 determines whether the calculated index value is smaller than a predetermined first threshold TH1. The index value is a value representing a temporal change of a sheet.

If the index value is smaller than the first threshold TH1 (YES in step S1613), the CPU 114 terminates the check processing for the print position adjustment. If the index value is equal to or greater than the first threshold TH1 (NO in step S1613), the processing proceeds to step S1614. In step S1614, the CPU 114 determines whether the index value is smaller than a second threshold TH2 which is different from the first threshold.

The first threshold TH1 and the second threshold TH2 will be described. The first threshold TH1 is a value for determining whether a change in the water content of a sheet has reached the equilibrium state. If a change in the water content of a sheet has reached the equilibrium state due to a temporal change of the sheet, the index value is substantially "0", and thus there is no need to perform the print position adjustment. The first threshold TH1 is a value for determining whether the state of a sheet has reached the equilibrium state due to a temporal change of the sheet. When the index value is smaller than the first threshold TH1, there is no need to perform the print position adjustment, and thus the CPU 114 terminates the check processing for the print position adjustment.

The second threshold TH2 is a value for determining whether to correct the (n+1)th time (Tn+1). The time interval (WT) for displaying a warning for the print position adjustment and the increasing rate (a) are determined based on a shortest time exceeding the print position shift allowable value ΔTH. Accordingly, if the warning message for the print position adjustment is constantly displayed at the time calculated by n-th time (Tn)=(print position adjustment execution time Tc)+αWT, the warning may be displayed unnecessarily frequently. For this reason, it is determined whether to correct the (n+1)th time (Tn+1) based on the magnitude of the index value.

The relationship between the first threshold TH1 and the second threshold TH2 is represented by TH1<TH2<1.0. The time interval (WT) for displaying the warning for the print position adjustment and the increasing rate (α) are determined based on a shortest time exceeding the print position shift allowable value ΔTH, and thus TH2<1.0 holds. For ease of the explanation of the present exemplary embodiment, the following description is made assuming that the first threshold TH1 is "0.05" and the second threshold TH2 is "0.80".

If the index value is equal to or greater than the second threshold TH2 (NO in step S1614), the CPU 114 determines that the index value is a value that is equal to or greater than "0.80" and close to "1" and the processing proceeds to step S1615. In step S1615, since the CPU 114 determines that the sheet changes with time as predicted, and the CPU 114 performs the calculation as follows (n+1)th time (Tn+1)=(print position adjustment execution time Tc)+αWT.

If the index value is smaller than the second threshold TH2 (YES in step S1614), the processing proceeds to step S1616. In step S1616, the CPU 114 adjusts the (n+1)th time (Tn+1) based on the index value. In this case, since the index value is smaller than "0.80", the CPU 114 determines that the temporal change of the sheet is smaller than predicted. Accordingly, the CPU 114 delays the (n+1)th time (Tn+1) when the warning for the print position adjustment is displayed. The (n+1)th time (Tn+1) is delayed by correcting the (n+1)th time (Tn+1) using, for example, the reciprocal of the index value. The CPU 114 changes an arithmetic equation for determining the next warning time, and delays the time when the warning for the print position adjustment is displayed. For example, the following equation is used.

(n+1)th time (Tn+1)=(print position adjustment execution time Tc)+αWT/[(Xn−Xn−1)/ΔTH}×{(Tn−Tn−1)/(Tc−Tn−1)}]       (3)

While such an equation is used to simplify the explanation in the present exemplary embodiment, any equation may be used as long as the equation corrects the (n+1)th time (Tn+1) to be delayed when the index value is smaller than "1".

In step S1617, after determining the (n+1)th time (Tn+1), the CPU 114 adds "1" to the variable n and repeatedly performs the processing of step S1607 and subsequent steps until the index value becomes smaller than the first threshold TH1. Such processing enables the adjustment of the time interval for displaying a warning for the print position adjustment according to a temporal change of a sheet. If the temporal change of the sheet has reached the equilibrium state, the warning for the print position adjustment is not displayed to the operator. More specifically, the image forming apparatus 100 stops displaying the warning message.

Figure 18A:
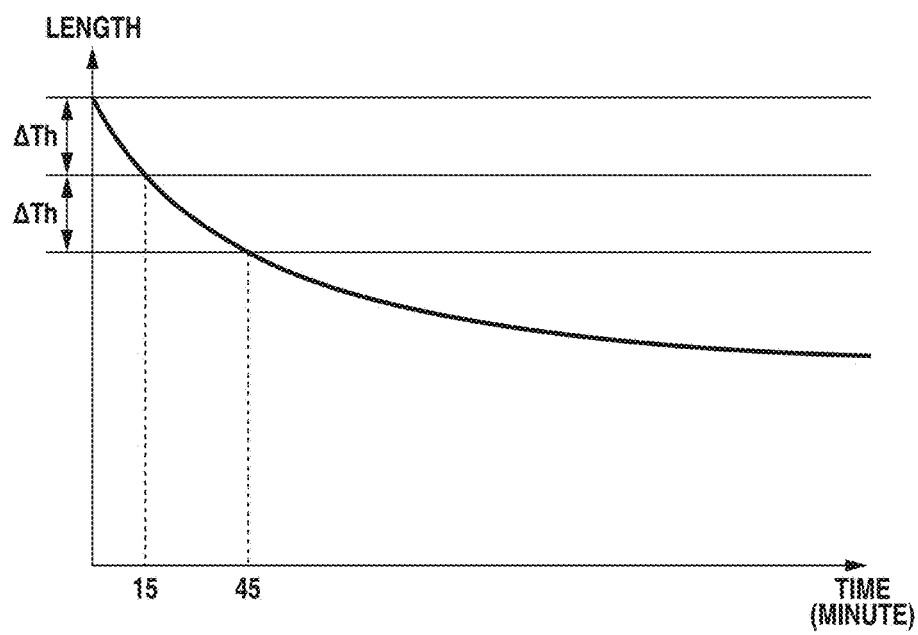
FIG. 18A is a graph illustrating each timing when a warning for print position adjustment is displayed.
Figure 18B:
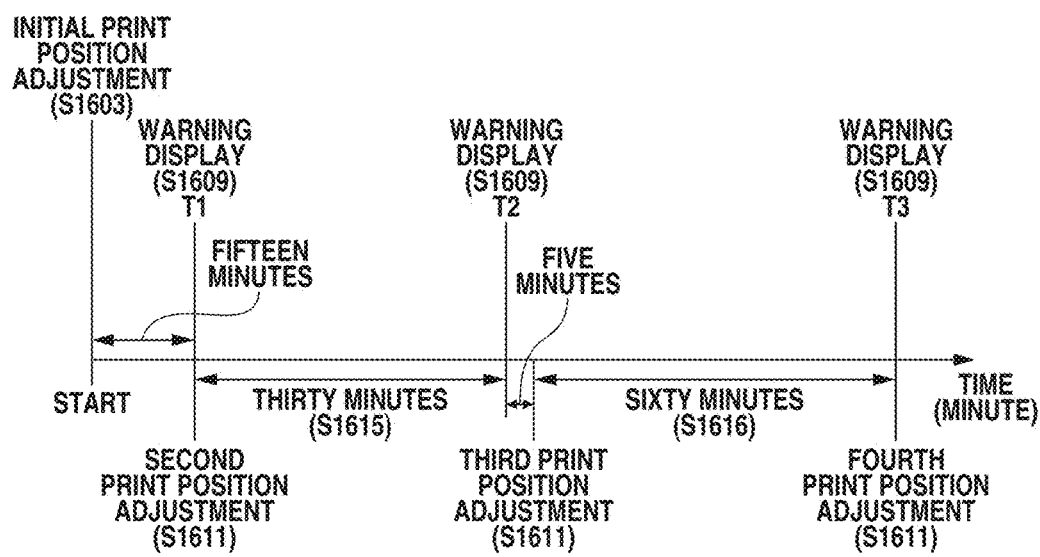
FIG. 18B is a diagram illustrating each timing when a warning for print position adjustment is displayed.

FIG. 18A is a graph illustrating each timing when a warning for the print position adjustment is displayed, and FIG. 18B is a diagram illustrating each timing when a warning for the print position adjustment is displayed.

FIG. 18A is a graph illustrating a change in the water content of the sheet "XYZ COMPANY COLOR 81" until the change in the water content thereof reaches the equilibrium state. The horizontal axis represents elapsed time from a time when sheets are unwrapped, and the vertical axis represents a change in the length of each sheet. The length of each sheet reaches the equilibrium state due to a lapse of time. The print position shift allowable value ΔTH is represented as an allowable value ΔTh of a change in the length of each sheet. This is because a print position shift occurs in proportion to a change in the length of the sheet at the read position 807 (see FIG. 8) on the back surface of the sheet.

In the "XYZ COMPANY COLOR 81", the time interval for displaying a warning for the print position adjustment is set to "15" and the increasing rate is set to "2.0" (see row 603 in FIG. 6). This is because the warning for the print position adjustment is displayed before a change in the length of the sheet reaches the print position shift allowable value ΔTH.

FIG. 18B is a time chart when a warning is displayed. In the case of using the "XYZ COMPANY COLOR 81", when the operator performs the first print position adjustment as illustrated in FIG. 17 (S1603), the warning message for the print position adjustment is displayed after a lapse of 15 minutes (S1609).

When the operator performs the second print position adjustment (S1611), a second time (T2) is determined by the processing of steps S1612 to S1616. Assume herein that the print position adjustment is performed immediately after the warning display and the index value is substantially "1". In this case, the index value is greater than the first threshold TH1 (0.05) and the second threshold TH2 (0.80). Accordingly, the second time (T2) is calculated as T2=Tc(15)+a (2.0)×WT(15)=15+2.0×15=45 by the processing of step S1615. Thus, the next warning display is performed after a lapse of 30 minutes after the second print position adjustment.

At the second time (T2), the warning message for the print position adjustment is displayed (S1609). The operator performs the third print position adjustment (S1611). Assume herein that the print position adjustment is performed after a lapse of time (five minutes) from the warning display and the index value is "0.5". In this case, the index value is greater than the first threshold TH1 (0.05) and smaller than the second threshold TH2 (0.80). Accordingly, a third time (T3) is corrected by the processing of step S1616. In the present exemplary embodiment, the third time (T3) is calculated as the third time (T3)=Tc(50)+α(2.0)×WT (15)/index value (0.5)=50+2.0×15/0.5=110. Thus, the next warning display is performed after a lapse of 60 minutes after the third position adjustment.

At the third time (T3), the warning message for the print position adjustment is displayed (S1609). The operator performs a fourth print position adjustment (S1611). Assume herein that the print position adjustment is performed immediately after the warning display and the index value is "0". In this case, since the index value is smaller than the first threshold TH1 (0.05), the processing is terminated without displaying the warning for the print position adjustment.

In addition, the time interval for displaying the warning for the print position adjustment set in the column 620 of the sheet library illustrated in FIG. 6 may be changeable by the operator using the operation panel 120. The operator sets the time interval for displaying the warning for the print position adjustment according to the environmental condition such as the temperature and humidity. Thus, the first time (T1) is set. This setting is made in order to set a shortest time exceeding the print position shift allowable value ΔTH as the time interval for displaying the warning for the print position adjustment. The time interval for displaying the warning for the print position adjustment can be set by, for example, enabling editing of the value displayed in the display area 509 of the interface screen 500 illustrated in FIG. 5.

The image forming apparatus 100 according to the present exemplary embodiment having the configuration as described above can appropriately determine the time interval for displaying the warning for the print position adjustment according to a temporal change of the state (water content) of each sheet. The temporal change of the state of each sheet is detected according to a change in the print position shift amount for performing the print position adjustment. This eliminates the need for the operator to determine whether to execute, on each sheet stored in a plurality of containers, the print position adjustment due to a change in the water content of each sheet, in consideration of the type of each sheet.

According to the image forming apparatus described in the present exemplary embodiment, it is possible to execute the print position adjustment at an appropriate timing.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2016-240253, filed Dec. 12, 2016, and No. 2016-248689, filed Dec. 22, 2016, which are hereby incorporated by reference herein in their entirety.

What is claimed is:

1. An image forming apparatus comprising:
a container in which a sheet is contained;
an image forming unit configured to form an image on the sheet;
a reading unit configured to read a test image formed on the sheet; and
a controller configured to
control the image forming unit to form the test image on the sheet,
control the reading unit to read the test image, and
generate, based on a reading result of the reading unit, an image forming condition for correcting a shift between a position of an image to be formed on a first surface of the sheet by the image forming unit and a position of an image to be formed on a second surface different from the first surface of the sheet by the image forming unit,
wherein the controller determines a timing for the image forming unit to subsequently form the test image based on a time period during which the sheet is contained in the container.

2. The image forming apparatus according to claim 1, wherein the controller determines, based on the time period during which the sheet is contained in the container, the timing to be delayed more as the time period increases.

3. The image forming apparatus according to claim 1, wherein the test image includes a first test image to be formed on the first surface of the sheet, and a second test image to be formed on the second surface different from the first surface of the sheet.

4. The image forming apparatus according to claim 1, further comprising another container,
wherein the controller selects a container from the containers, and forms the test image on the sheet contained in the selected container, and
wherein the controller determines, based on a time period during which the sheet is contained in the selected container, a timing for the image forming unit to subsequently form the test image on the sheet contained in the selected container.

5. The image forming apparatus according to claim 4, wherein the controller receives user instruction, and
wherein the controller selects a container from the containers based on the user instruction.

6. The image forming apparatus according to claim 5, wherein the user instruction corresponds to information indicating a container in which a sheet to be used for generating the image forming condition is contained.

7. The image forming apparatus according to claim 5, wherein the user instruction corresponds to information indicating a type of a sheet to be used for generating the image forming condition.

8. The image forming apparatus according to claim 1, wherein the controller notifies updating of the image forming condition based on the determined timing.

9. The image forming apparatus according to claim 1,
wherein the reading unit reads the test image while conveying the sheet having the test image formed thereon along a conveyance path, and
wherein the controller controls the reading unit to read the test image after the test image is formed on both surfaces of the sheet.

10. The image forming apparatus according to claim 1,
wherein the reading unit includes a first sensor, a second sensor, and a conveyance path for conveying the sheet having the test image formed thereon, and
wherein the first sensor is disposed opposite to the second sensor across the conveyance path.

11. A control method for an image forming apparatus including a container in which a sheet is contained, an image forming unit configured to form an image on the sheet, and a reading unit configured to read a test image formed on the sheet, the control method comprising:
test image forming the test image on the sheet;
reading the test image;
generating, based on a reading result by the reading unit, an image forming condition for correcting a shift between a position of an image to be formed on a first surface of the sheet by the image forming unit and a position of an image to be formed on a second surface different from the first surface of the sheet by the image forming unit; and
determining a timing for subsequently executing the test image forming based on a time period during which the sheet is contained in the container.

12. The control method according to claim 11, wherein the timing for subsequently executing the test image forming is determined to be delayed more as the time period increases, based on the time period during which the sheet is contained in the container.

13. The control method according to claim 11, wherein the test image forming includes a first test image forming a first test image on the first surface of the sheet, and a second test image forming a second test image on the second surface different from the first surface of the sheet.

14. The control method according to claim 11, further comprising selecting a container from among a plurality of containers based on user instruction,
wherein the test image is formed on the sheet contained in the selected container, and
wherein the timing is determined based on a time period during which the sheet is contained in the selected container.

15. The control method according to claim 14, wherein the user instruction corresponds to information indicating a container in which a sheet to be used for generating the image forming condition is contained.

16. The control method according to claim 14, wherein the user instruction corresponds to information indicating a type of a sheet to be used for generating the image forming condition.

17. The control method according to claim 11, further comprising notifying updating of the image forming condition based on the determined timing.

18. The control method according to claim 11, wherein the test image is read while the sheet having the test image formed thereon is conveyed along a conveyance path.

* * * * *